United States Patent [19]

Hsieh et al.

[11] Patent Number: 5,267,187
[45] Date of Patent: Nov. 30, 1993

[54] LOGIC STRUCTURE AND CIRCUIT FOR FAST CARRY

[76] Inventors: Hung-Cheng Hsieh, 583 Loch Lomond Ct., Sunnyvale, Calif. 94087; William S. Carter, 3024 Aspen Dr., Santa Clara, Calif. 95051; Charles S. Erickson, 3412 Atwater Ct., Fremont, Calif. 94536; Edmond Y. Cheung, 1302 Shelby Creek La., San Jose, Calif. 95120

[21] Appl. No.: 944,002

[22] Filed: Sep. 11, 1992

Related U.S. Application Data

[63] Continuation of Ser. No. 522,336, May 10, 1990, abandoned.

[51] Int. Cl.$^5$ .............................. G06F 7/50
[52] U.S. Cl. .................................. 364/784
[58] Field of Search ............... 364/784–786, 364/745

[56] References Cited

U.S. PATENT DOCUMENTS

| | | | |
|---|---|---|---|
| 4,124,899 | 11/1978 | Birkner et al. | 364/716 |
| 4,706,216 | 11/1987 | Carter | 365/77 |
| 4,758,745 | 7/1988 | Elgamal et al. | 307/465 |
| 4,761,759 | 8/1988 | Nakagawa | 364/769 |
| 4,870,302 | 9/1989 | Freeman | 307/465 |
| 4,897,808 | 1/1990 | Nakagawa et al. | 364/784 |
| 4,920,509 | 4/1990 | Hmida et al. | 364/784 |

OTHER PUBLICATIONS

Mano, "Digital Logic and Computer Design", Chapter 9, pp. 376-378, 1979 by Prentice-Hall, Inc.

*Primary Examiner*—Tan V. Mai

[57] ABSTRACT

Programmable logic devices which include multiple blocks of combinatorial function generators and storage elements, and which are interconnected by a programmable interconnect structure are used, among other things for performing arithmetic functions which use logic for generating the carry function. When a large number of bits is to be processed, the carry function typically causes significant delay or requires significant additional components to achieve a result at high speed. The present invention provides dedicated hardware within the logic blocks for performing the carry function quickly and with a minimum number of components. The invention takes advantage of the fact that a carry signal to be added to two bits can be propagated to the next more significant bit when the two binary bits to be added are unequal, and that one of the bits can serve as the carry signal when the bits are equal.

37 Claims, 15 Drawing Sheets

Schematic Symbol For Full Adder

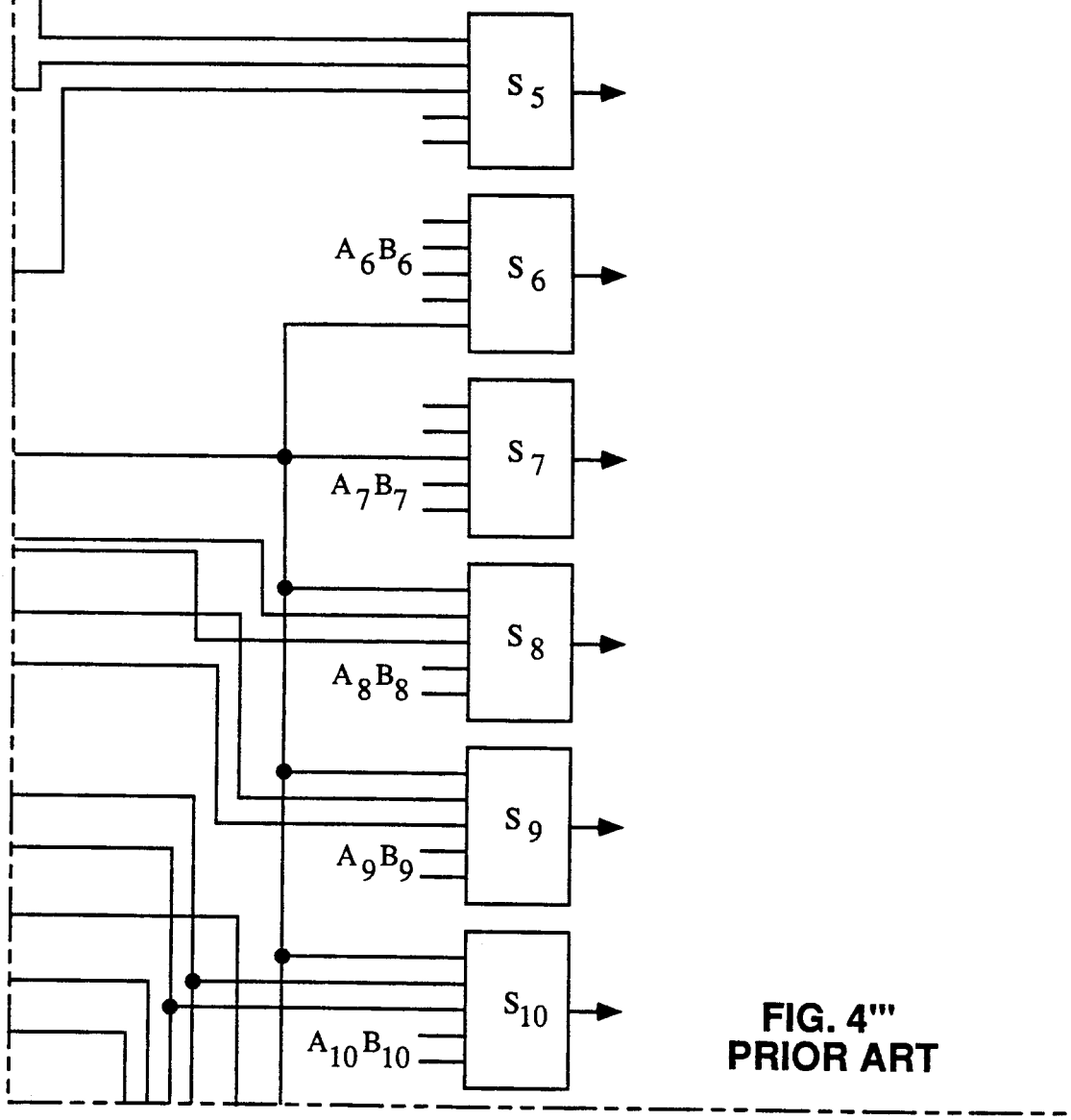
FIG. 4''''
PRIOR ART

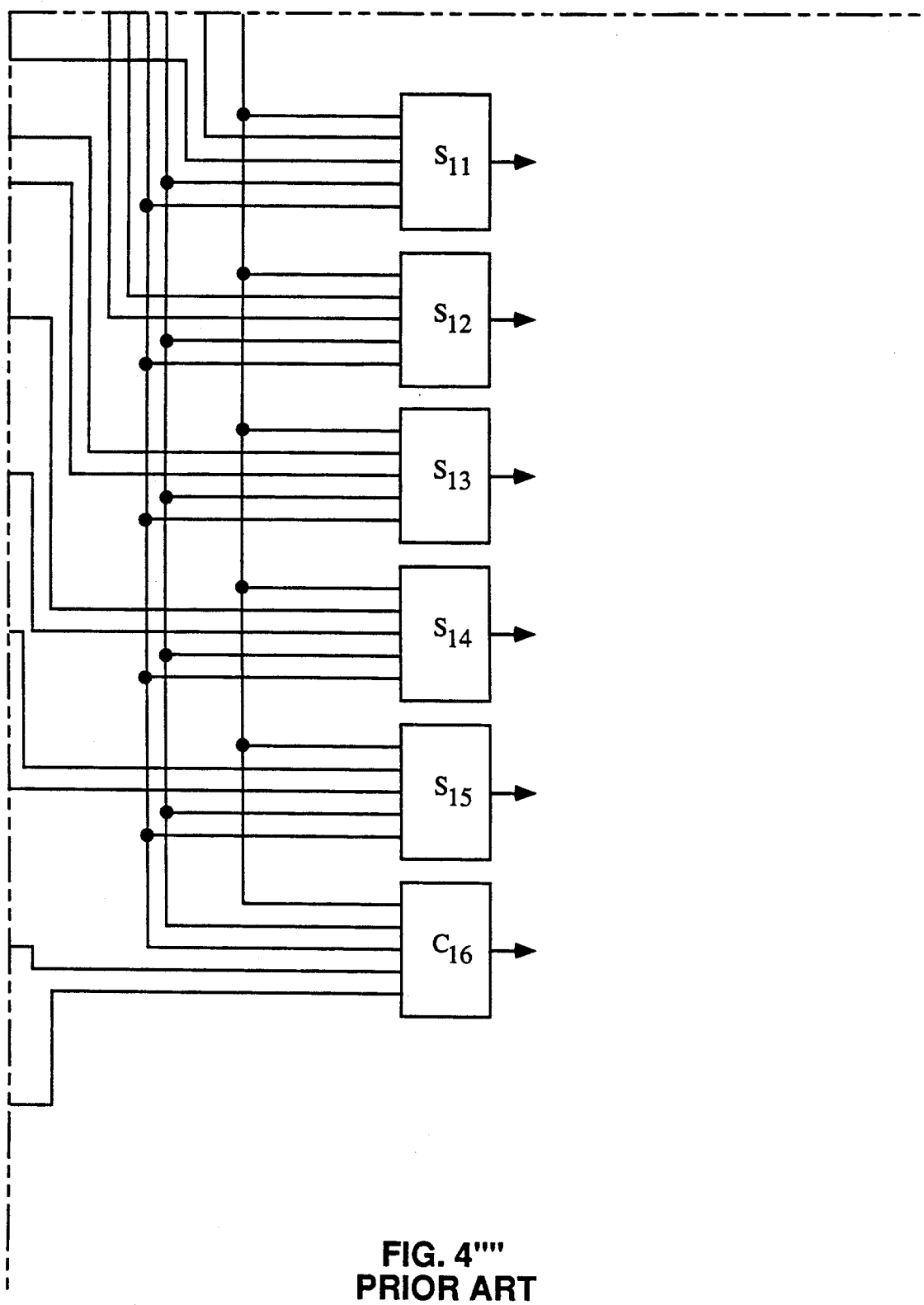
FIG. 4''''
PRIOR ART

|   | A | B | $C_{IN}$ | $C_{OUT}$ |
|---|---|---|---|---|
| 1 | 0 | 0 | 0 | 0 |
| 2 | 0 | 0 | 1 | 0 |
| 3 | 0 | 1 | 0 | 0 |
| 4 | 1 | 0 | 0 | 0 |
| 5 | 0 | 1 | 1 | 1 |
| 6 | 1 | 0 | 1 | 1 |
| 7 | 1 | 1 | 0 | 1 |
| 8 | 1 | 1 | 1 | 1 |

LOGIC STRUCTURE AND CIRCUIT FOR FAST CARRY

This application is a continuation of application Ser. No. 07/522,336, filed May 10, 1990, now abandoned.

FIELD OF THE INVENTION

This invention relates to large integrated circuits, more particularly to programmable or configurable logic devices.

BACKGROUND

One kind of function performed in programmable logic devices is arithmetic. A device such as a configurable logic array of Xilinx, Inc., assignee of the present invention, can perform arithmetic as well as a multitude of other logic functions. Such devices are described in U.S. Pat. Nos. 4,870,302 and 4,706,216, and U.S. patent application Ser. No. 07/387,566, which are incorporated herein by reference. Because these devices are intended for general purpose functions, arithmetic is relatively slow and requires a significant amount of silicon area.

Other programmable logic devices, such as the programmable array logic device described in U.S. Pat. No. 4,124,899 and user programmable devices described in U.S. Pat. No. 4,758,745 also can be programmed to perform arithmetic. These two patents are also incorporated by reference. In these devices the speed of performing arithmetic and other functions which use carry logic is limited by propagation of the carry signal, and the general purpose logic used to implement the carry function is significant.

For understanding how logic devices perform arithmetic, and particularly what causes delay, the following discussion of arithmetic functions will focus on adders. However, the discussion can easily be extended to apply to subtractors, incrementers, decrementers, and accumulators, in addition to other circuits which use a carry-logic.

The following discussion will focus on operation of the middle stages in a multi-bit adder. The least significant bit is a special case because there can be no carry signal to be received from a less significant bit.

The most significant bit is a special case because the carry bit can be used for determining an overflow condition. These two special cases will be discussed in detail later.

By reference to FIGS. 1a, 1b and 2, it will be explained how the speed of a single bit ripple carry adder (FIGS. 1a and 1b), and thus a multi-bit ripple carry adder constructed by cascading single bit adders (FIG. 2) is constrained by the speed at which the signal at the carry-in terminal is propagated to the carry-out terminal.

The Boolean logic equations governing the behavior of the single bit adder shown in FIG. 1a are:

$$S_i = (A_i \oplus B_i) \oplus C_{i-1} \quad (1)$$

$$C_i = A_i \bullet B_i + (A_i \oplus B_i) \bullet C_{i-1} \quad (2)$$

where
- $\oplus$ represents the exclusive-or (XOR) function,
- $\bullet$ represents the AND function, and
- $+$ represents the OR function.

Eq. (1) shows that the sum is a function of a carry-in from a less significant bit in addition to the single bits $A_i$ and $B_i$ being added. The ripple carry adder algorithm of Eqs. (1) and (2) shows that the sum for a particular bit cannot be calculated until the carry-out from the previous bit is available. The sum $S_i$ is the output of an XOR gate and cannot be generated until each of its inputs, one of which is the carry-in signal $C_{i-1}$, is available.

Furthermore, the carry-out $C_i$ also cannot be generated until the less significant carry bit $C_{i-1}$ is available. Referring now to FIG. 2, the propagation of the carry signal through successive stages of a ripple carry adder will be explained. AND gate 67 in the second adder stage Add$_{i+1}$ receives one of its inputs from the output of XOR gate 66 after only 1 gate delay. However, assuming that the carry-in signal $C_{i-1}$ is preset (that is, that Add$_i$ is the least significant bit), AND gate 67 could wait an additional 3 gate delays for the effect of $A_i$ and $B_i$ to propagate through gates 61, 62 and 65 before its other input, the carry-out $C_i$ from the less significant bit, has been generated from the carry out of the less significant bit $C_{i-1}$ and the less significant bits $A_i$ and $B_i$ to be added. Furthermore, the carry-out $C_{i+1}$ of the second bit Add$_{i+1}$ is further delayed through 2 more gates after the carry bit $C_i$ has been generated. That is, combining the inputs on $A_{i+1}$ and $B_{i+1}$ with the carry in signal $C_i$ to generate $C_{i+1}$ requires that $C_i$ propagate through AND gate 67 and OR gate 70. Thus, there will not be a valid carry-in signal $C_{i+1}$ for input to a third stage until 5 gate delays after the application of the input signals $A_i$ and $B_i$. Thus, the speed of the conventional ripple carry adder is constrained by the speed of propagation of the carry signal. The propagation delay of a conventional ripple carry adder is $2n+1$ gates where n is the number of stages in the multi-bit adder.

Since addition is the foundation of many other important functions and operations, it has been important to the computer industry to devise faster adder circuits by speeding up the carry propagation time. In general, these methods work by trading component density and complexity for carry propagation speed.

One well-known algorithm which achieves a faster carry propagation speed is called look-ahead carry logic. A circuit for implementing look-ahead carry logic is shown in FIG. 3. Understanding this logic requires the introduction of two new variables:

$$P_i = A_i \oplus B_i \quad (3)$$

$$G_i = A_i \bullet B_i \quad (4)$$

The variable P is called "carry propagate" because when P is high, carry-in is propagated to carry-out. The variable G is called "carry generate" because when G is high, a carry-out is generated by the bits being added.

Eqs. (1) and (2) can be rewritten in terms of these new variables:

$$S_i = P_i \oplus C_{i-1} \quad (5)$$

$$C_i = G_i + P_i \bullet C_{i-1} \quad (6)$$

With some minor algebraic manipulation, Eq. (6) can be used to write new equations where the carry bit at each level is dependent only on the addends at each level and the least significant carry bit. The following equations are implemented in the four bit adder shown in FIG. 3:

(a) $C_0 = A_0B_0 = G_0$ (7)
(b) $C_1 = G_1 + P_1C_0 = G_1 + P_1C_0$
(c) $C_2 = G_2 + P_2C_1 = G_2 + P_2(G_1 + P_1C_0)$
   $= G_2 + P_2G_1 + P_2P_1C_0$
(d) $C_3 = G_3 + P_3C_2 = G_3 + P_3(G_2 + P_2G_1 + P_2P_1C_0)$
   $= G_3 + P_3G_2 + P_3P_2G_1 + P_3P_2P_1C_0$

Each $G_i$ and $P_i$ is a function only of $A_i$ and $B_i$ and not of previous carry values, as can be seen in Eqs. 3 and 4. Second, note in Eq. 7b that $C_1$ is calculated as a function of $G_1$, $P_1$, and $C_0$, and that in Eq. 7c, $C_2$ is calculated as a function of $G_2$, $P_2$ and $C_1$. But since $C_1$ has been solved in terms of $C_0$, $C_2$ can also be solved in terms of $C_0$. Attention to Eq. 7d, and the more general Eq. 6 will reveal that each $C_i$ is a function of several $G_i$'s, $P_i$'s, and $C_0$. As can be seen in FIG. 3, the less significant bit is fed into the next significant bit only for the calculation of the sum, not for the calculation of the carry bit. Since each carry bit is a function of several $G_i$'s, $P_i$'s, and $C_0$, each carry bit is not dependent on the carry-out of any but the least significant bit. Thus the carry propagation delay of the look-ahead carry circuit is independent of the number of bits being added.

Referring still to FIG. 3 and FIG. 1a, the delay from the application of the input signals (A's and B's) to the appearance of a valid signal at the generate outputs ($G_i$'s) and propagate outputs ($P_i$'s) of an adder stage is 1 gate (this can be discerned from FIG. 1a). The delay added in FIG. 3 by the carry restorer portion of the look ahead carry circuitry is 2 gates, which makes a total of a 3 gate delay from the application of the input signals to the adder until the last carry out bit is available. This relationship is independent of the number of bits being added. For a multi-bit adder circuit, the delay will be significantly less than the delay of a conventional ripple carry adder circuit. However, as the number of stages is increased, the number of components increases significantly. Look ahead carry logic requires many more components than the conventional ripple carry adder requires to implement a stage of a multi-bit adder. This illustrates the idea that faster carry-propagation requires higher component density.

FIG. 4 shows another example of circuit components for implementing an adder. The adder of FIG. 4 is very fast, but, like the adder of FIG. 3, uses many components. Again, a faster carry logic requires a higher component density.

Pages 6-30 through 6-44 of Xilinx, Inc., "The Programmable Gate Array Data Book," copyright 1989, and available from Xilinx, Inc., 2100 Logic Drive, San Jose, Calif. 95124, show a variety of adders and counters which can be implemented in prior art Xilinx programmable logic devices. These pages of the Xilinx data book are incorporated herein by reference. Xilinx, Inc., owner of the copyright, has no objection to copying these pages but otherwise reserves all copyright rights whatsoever. The adder of FIG. 4 is shown on page 6-30 of the Xilinx data book. FIG. 5 shows a counter, also shown on page 6-34 of the Xilinx data book. In prior art Xilinx devices, calculating the sum requires one function generator, and calculating the carry function requires another function generator. Typically, two function generators are incorporated in one logic block of a Xilinx prior art configurable logic array.

Thus, in the adder circuits of both FIG. 4 and FIG. 5, and for other Xilinx prior art adder circuits as well, approximately one logic block is required for implementing each stage of an adder or counter.

SUMMARY OF THE INVENTION

According to the present invention, a programmable logic device having configurable logic blocks is provided with a circuit for implementing a fast carry logic. The fast carry logic circuit is useful when implementing adders, subtractors, accumulators, and other functions that utilize carry logic. Further, in a preferred embodiment, the circuit provided by the invention is realized in dedicated hardware and dedicated interconnect circuitry within a configurable logic array. This dedicated circuitry allows an improvement in the speed of propagation of the carry signal and in the density of logic functions that use carry logic. In a preferred embodiment, a circuit using carry logic is about four times as fast as the prior art, can be realized with about one-half the number of logic blocks, and leaves general purpose logic resources free for other functions. A preferred embodiment also allows for adding or subtracting a constant to a variable without using interconnect circuitry for providing the constant.

The invention takes advantage of a Boolean functional simplification of one of two logically equivalent carry functions:

$$C_i = (A \oplus B) \bullet (C_{i-1}) + \overline{(A \oplus B)} \bullet B \qquad (8)$$

$$C_i = (A \oplus B) \bullet (C_{i-1}) + \overline{(A \oplus B)} \bullet A \qquad (9)$$

The propagation delay of the circuit provided by the invention is less dependent on the number of bits being added than a ripple carry adder, the delay per logic block (two bits) being approximately the delay of two inverters. Further, the invention achieves a fast carry logic with fewer components than in either the carry logic of a conventional full-adder or the look-ahead carry logic. The invention allows an adder to be implemented with half or less of the delay of a conventional ripple carry adder. When the carry logic hardware is incorporated in a configurable logic array in conjunction with general purpose logic blocks, the fast carry logic circuits preferably have a dedicated interconnect structure between carry inputs and carry outputs of adjacent logic blocks which further increases the performance.

BRIEF DESCRIPTION OF THE DRAWINGS

FIG. 1b is a schematic symbol for the conventional full-adder stage shown in FIG. 1a.

DETAILED DESCRIPTION

A preferred embodiment of this invention is described with reference to FIGS. 6 and 7.

Figures 6, 7:
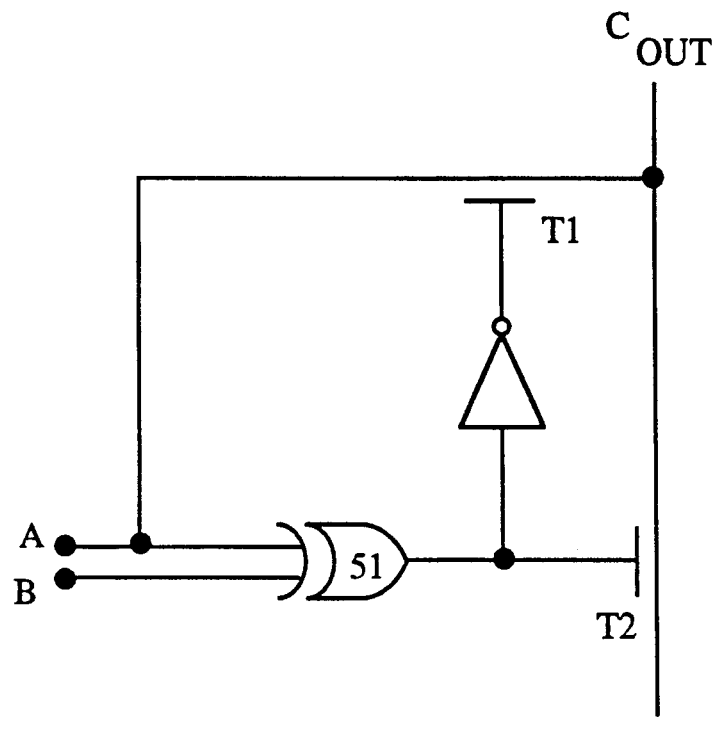
FIG. 6 is a schematic diagram of a circuit providing one bit of carry logic according to the present invention.
FIG. 7 is a truth-table for displaying the relationship between the variables A, B, $C_{in}$ and $C_{out}$.

The truth table in FIG. 7 shows the logical relationships between two single bits that are being added, the carry-in bit, and the carry-out bit. A careful analysis of this truth table has revealed a useful pattern. When A and B are equal (lines 1,2, 7, and 8), the value of the carry-out $C_{out}$ bit is the value of A and of B. When A and B are not equal, on the other hand, (lines 3-6), the value of the carry-out $C_{out}$ bit is the value of the carry-in $C_{in}$ bit. Two equivalent Boolean logic equations can represent this pattern:

$$C_{out} = (A \oplus B) \bullet (C_{in}) + (\overline{A \oplus B}) \bullet A \quad (10)$$

$$C_{out} = (A \oplus B) \bullet (C_{in}) + (\overline{A \oplus B}) \bullet B \quad (11)$$

The circuit in FIG. 6 implements equation (10). Two conditions are satisfied by this circuit. When A and B are not equal, the signal on the carry-in terminal is passed to the carry-out terminal and when A and B are equal, the signal on A is passed to the carry-out terminal.

As shown in FIG. 6, the two single bits being added, A and B, are applied to the two input terminals of XOR gate 51. If A and B are equal, a low output signal from XOR gate 51 turns on pass transistor T1 and turns off pass transistor T2, allowing passage of the signal from A to the carry-out terminal $C_{out}$. If A and B are not equal, the output of XOR gate 51 is high, which turns on pass transistor T2 and turns off pass transistor T1. This in turn allows passage of the signal on the carry-in terminal $C_{in}$ to the carry-out terminal $C_{out}$.

Figure 8:
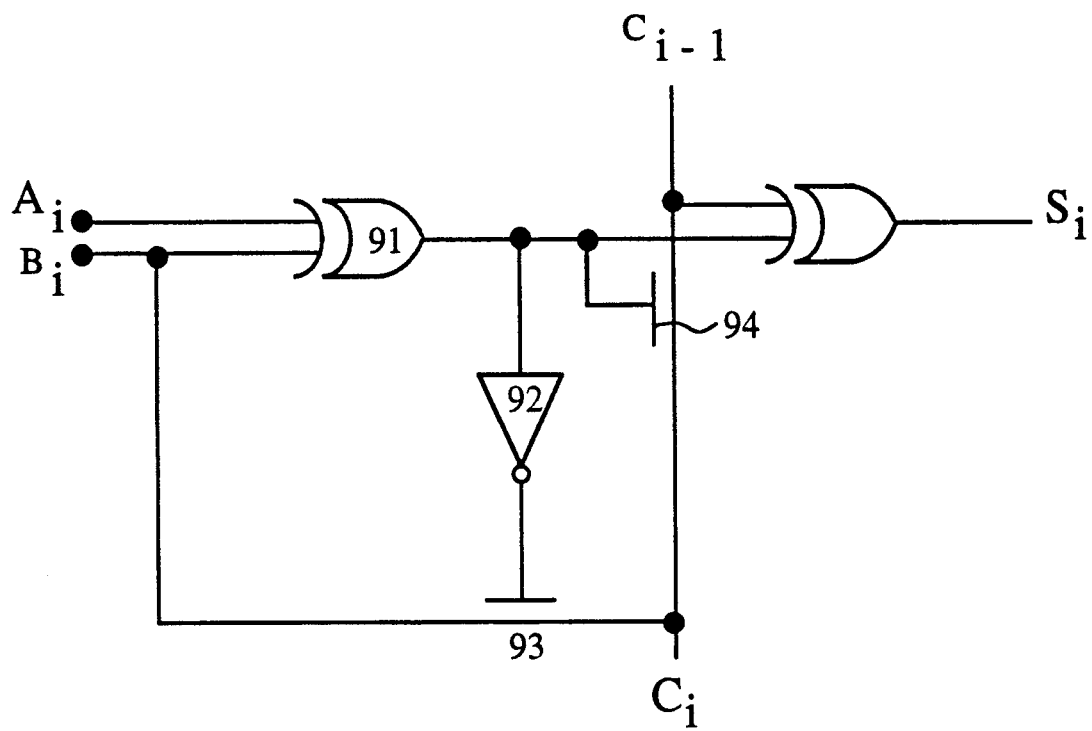
FIG. 8 is a schematic diagram of a circuit providing one bit of a full adder that uses the carry logic provided by the present invention.

FIG. 8 shows the first embodiment of the invention implemented in a full adder. It will now be shown by comparing FIG. 2 and FIG. 8 that the fast carry logic described above provides faster propagation of the carry signal than a conventional ripple carry adder. FIG. 8 shows one stage of a full adder circuit constructed according to the invention. The carry propagation is controlled as discussed above in connection with FIG. 6. As discussed above and shown in FIG. 2, the propagation delay of a conventional ripple carry adder is 1 AND gate plus 1 OR gate per pair of bits added plus 1 XOR gate. By contrast, as shown in FIG. 8, the worst-case delay of a circuit according to the invention occurs when one of the input signals, in this case $B_i$, is propagated to the carry out signal, that is, when the signal propagates through XOR gate 91 plus inverter 92 to turn on the pass-transistor 93. This happens simultaneously for all bits being added. The propagation delay for a carry signal to propagate through a long series of transistors such as transistor 94 adds only minimal time compared to a gate delay for generating the result of an addition. If four full-adder circuits such as shown in FIG. 8 are cascaded, in the worst case the output signal $C_{out}$ is available after an XOR gate delay plus an inverter delay plus the very small propagation delay through four pass transistors.

Figure 1A:
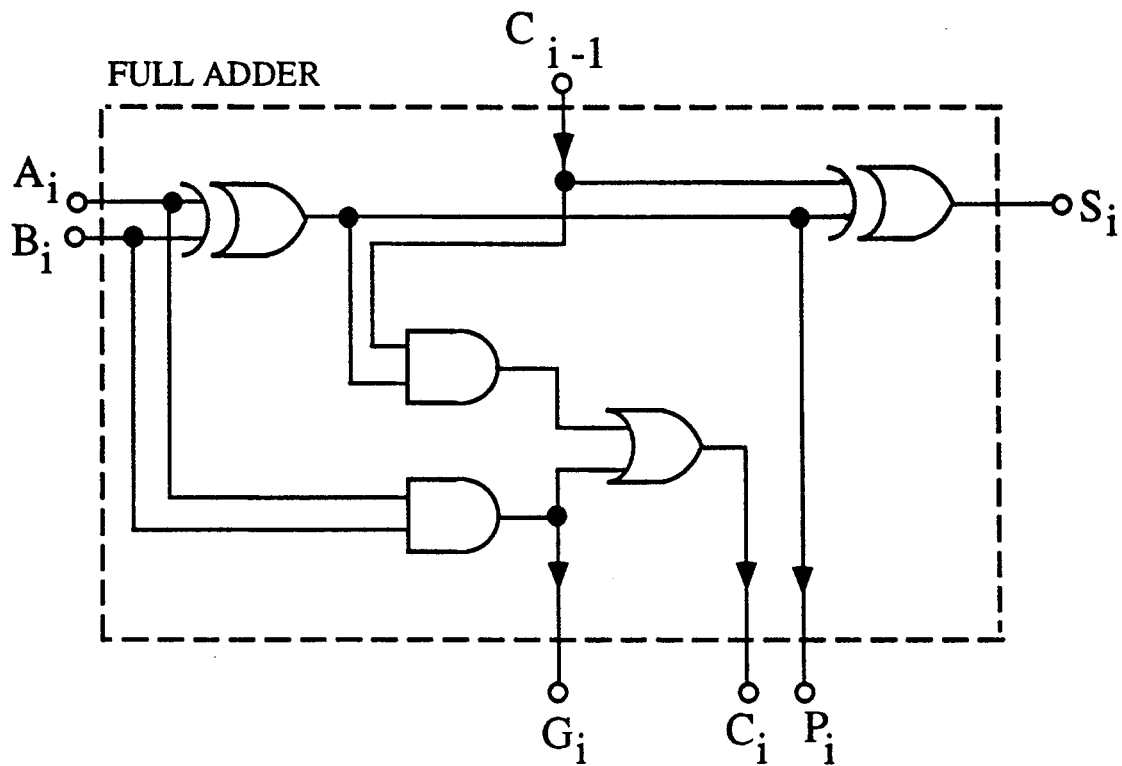
FIG. 1a is a schematic diagram showing one stage of a conventional full-adder.
Figure 1B:
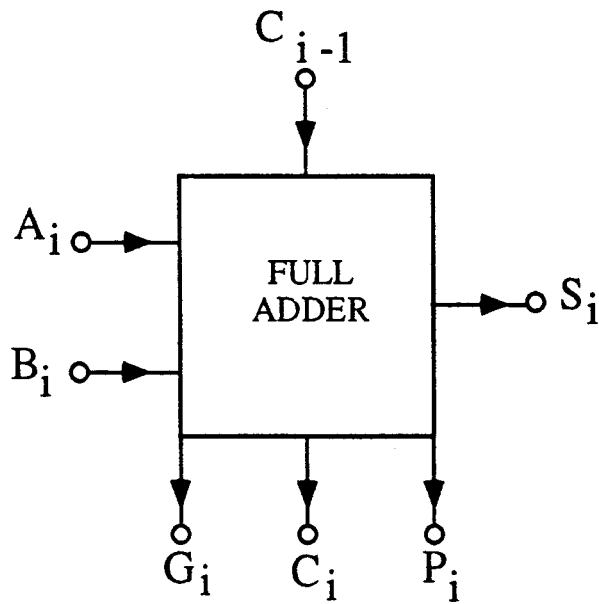
Figure 2:
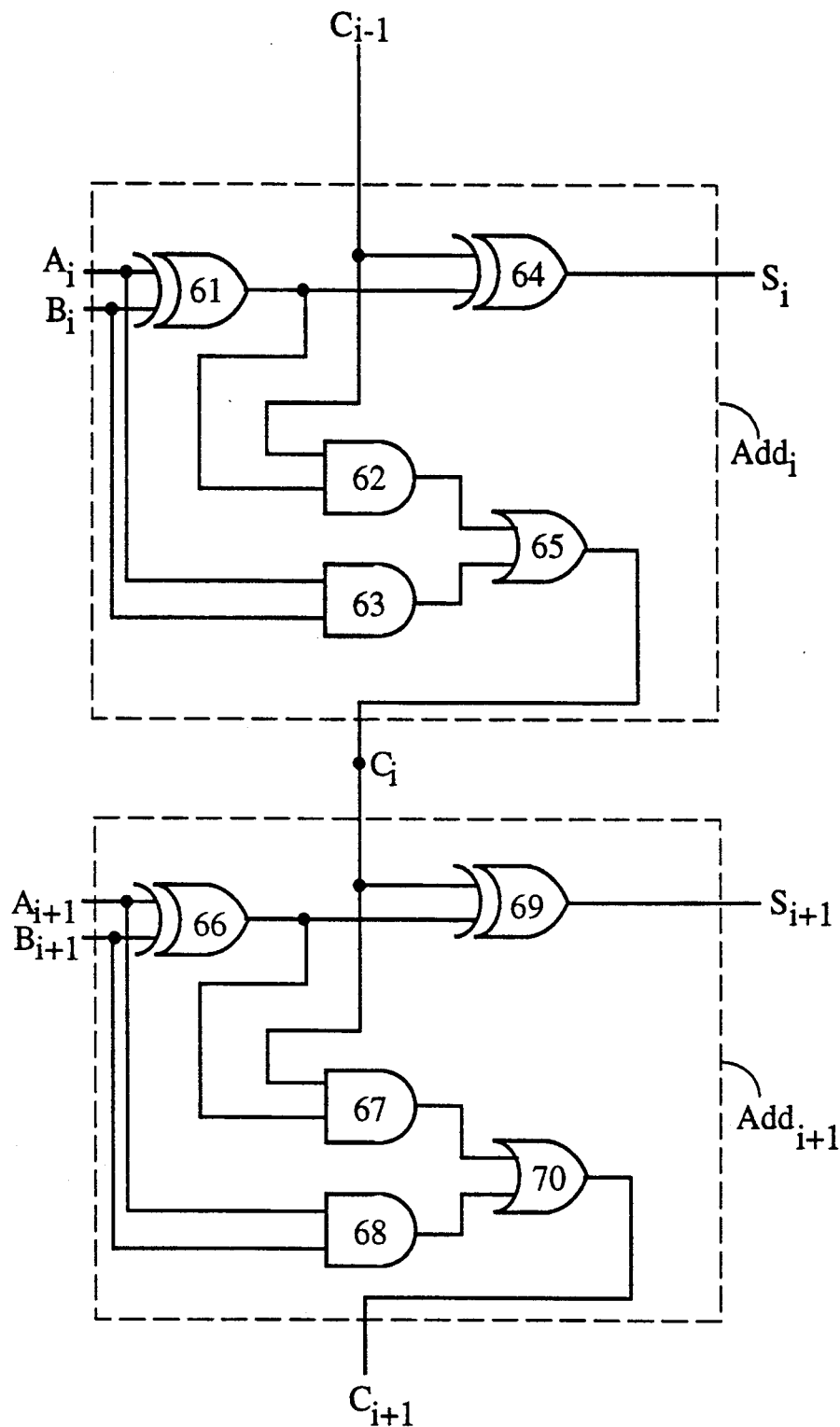
FIG. 2 is a schematic diagram of two full adders cascaded together.
Figure 3:
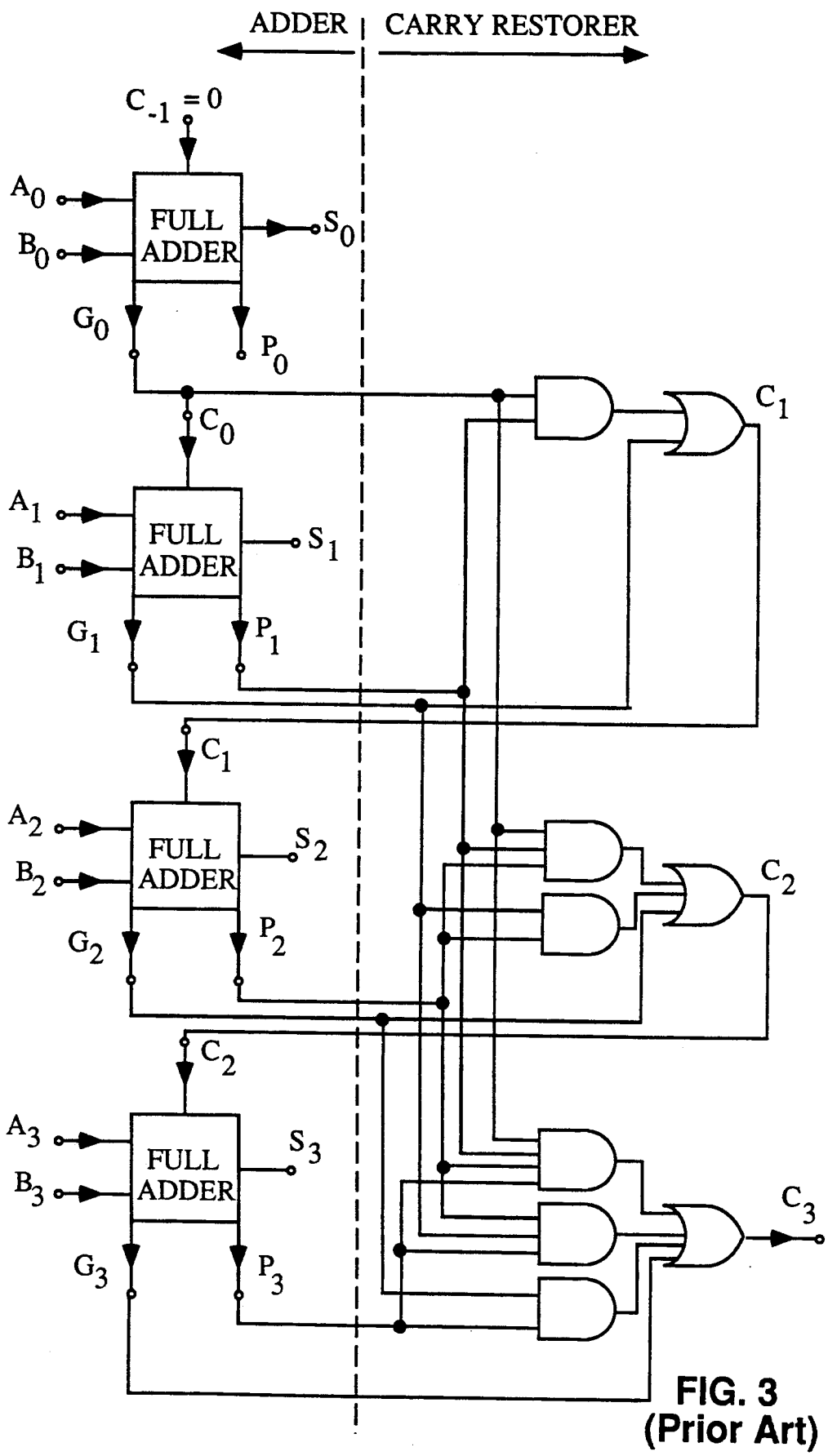
FIG. 3 is a schematic diagram of a four-bit adder with look-ahead carry logic.
Figure 4:
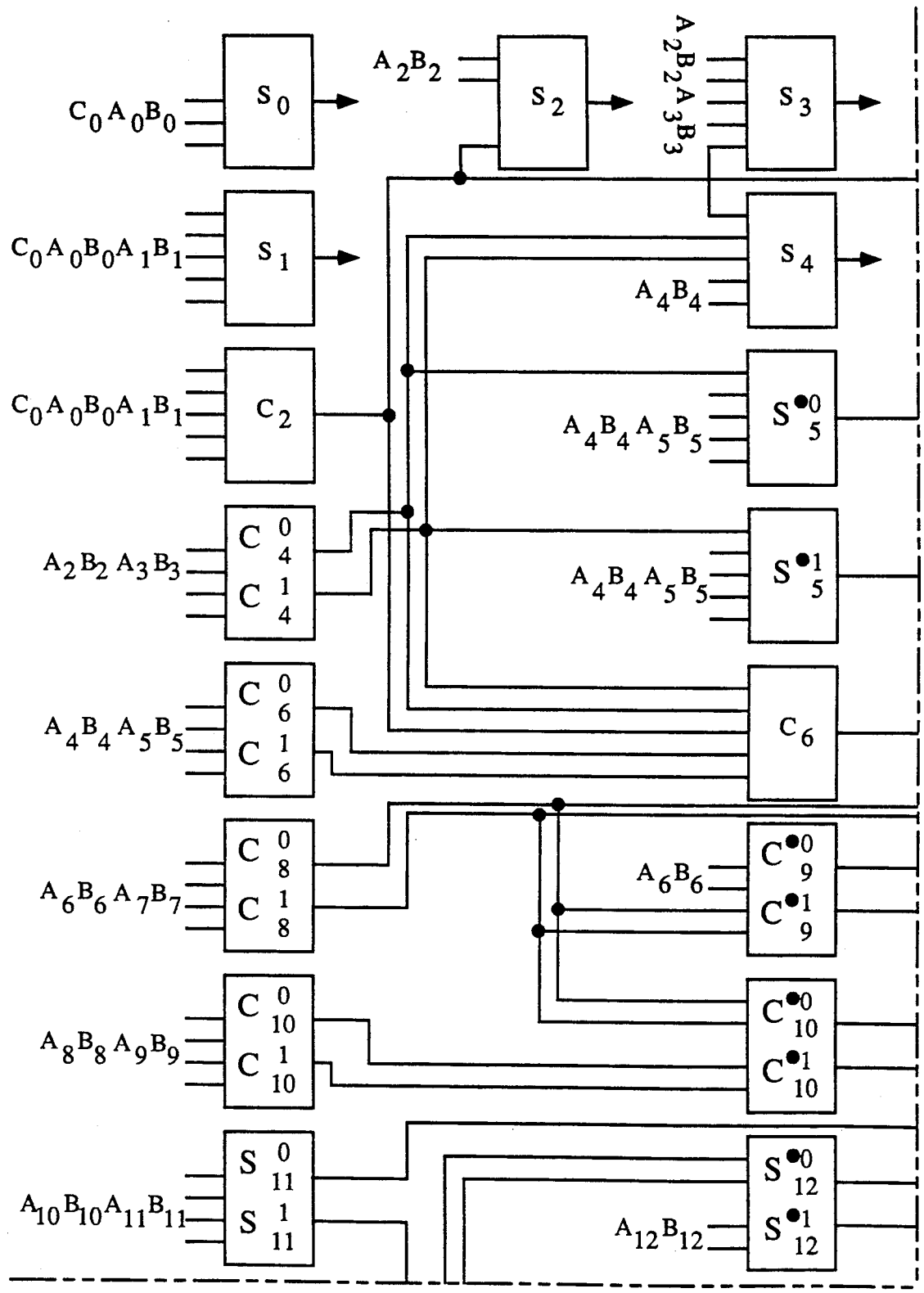
FIG. 4, comprising of FIGS. 4'-4'''', is a schematic diagram of a prior art adder.
Figure 4:
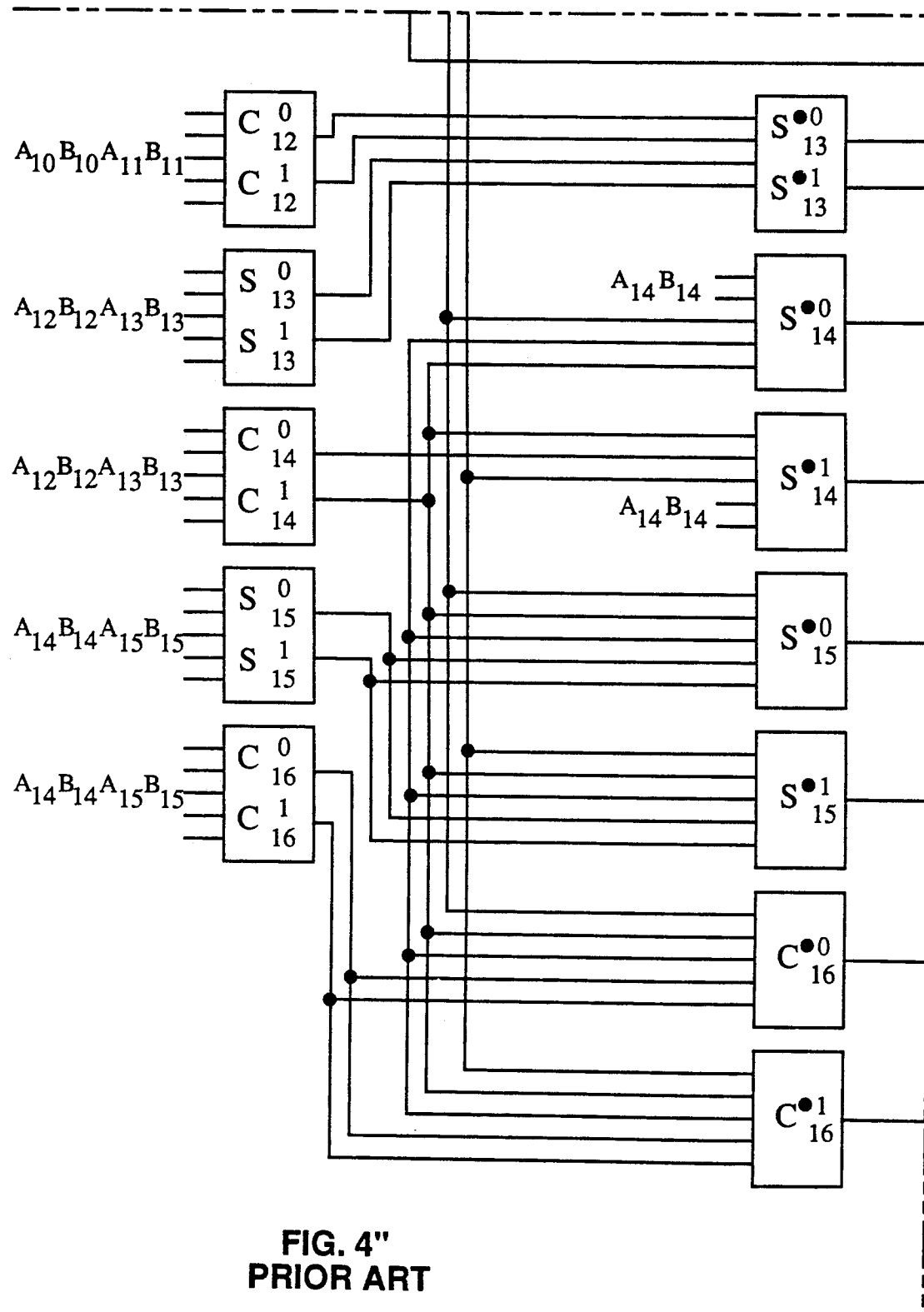
Figure 9:
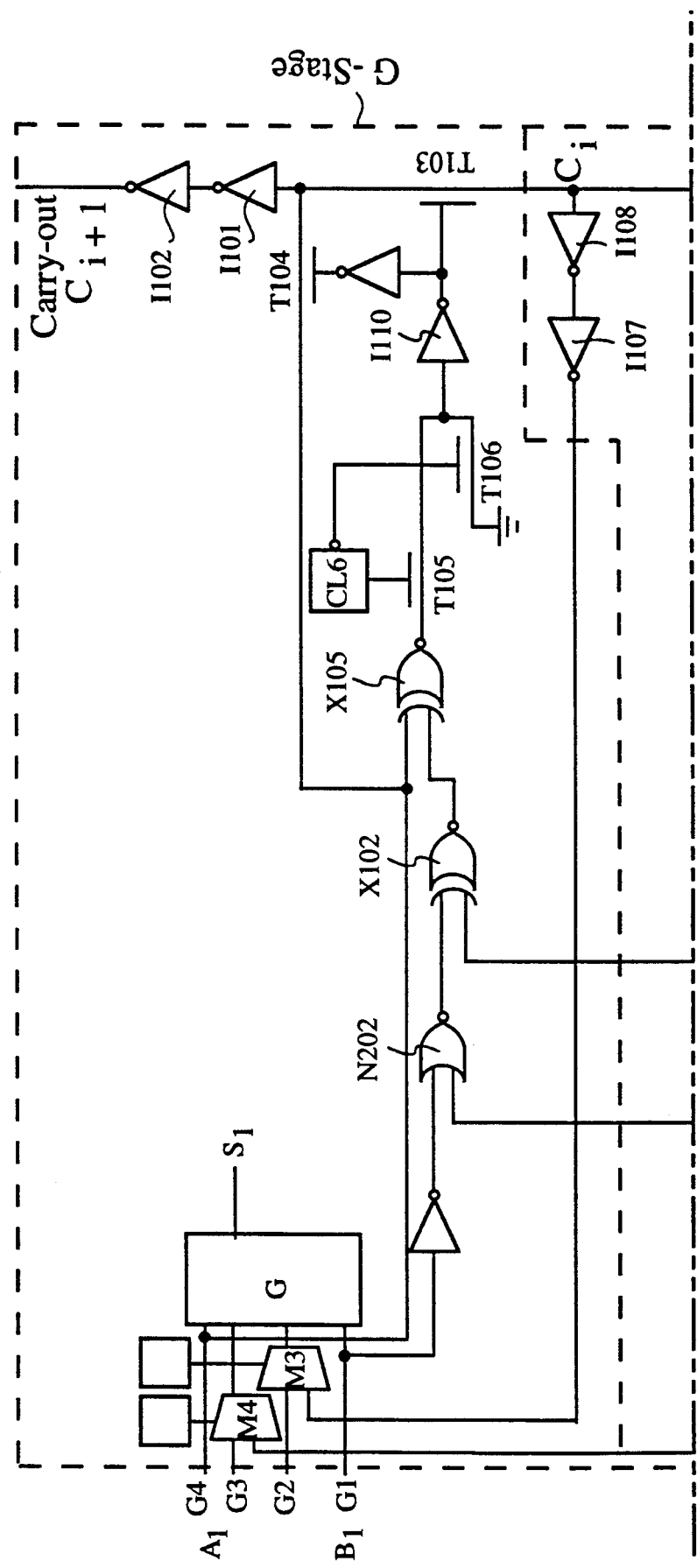
FIG. 9, comprising of FIGS. 9'-9'', is a schematic diagram of part of a logic block having two stages, each of which uses the carry logic provided by the present invention.
Figure 9:
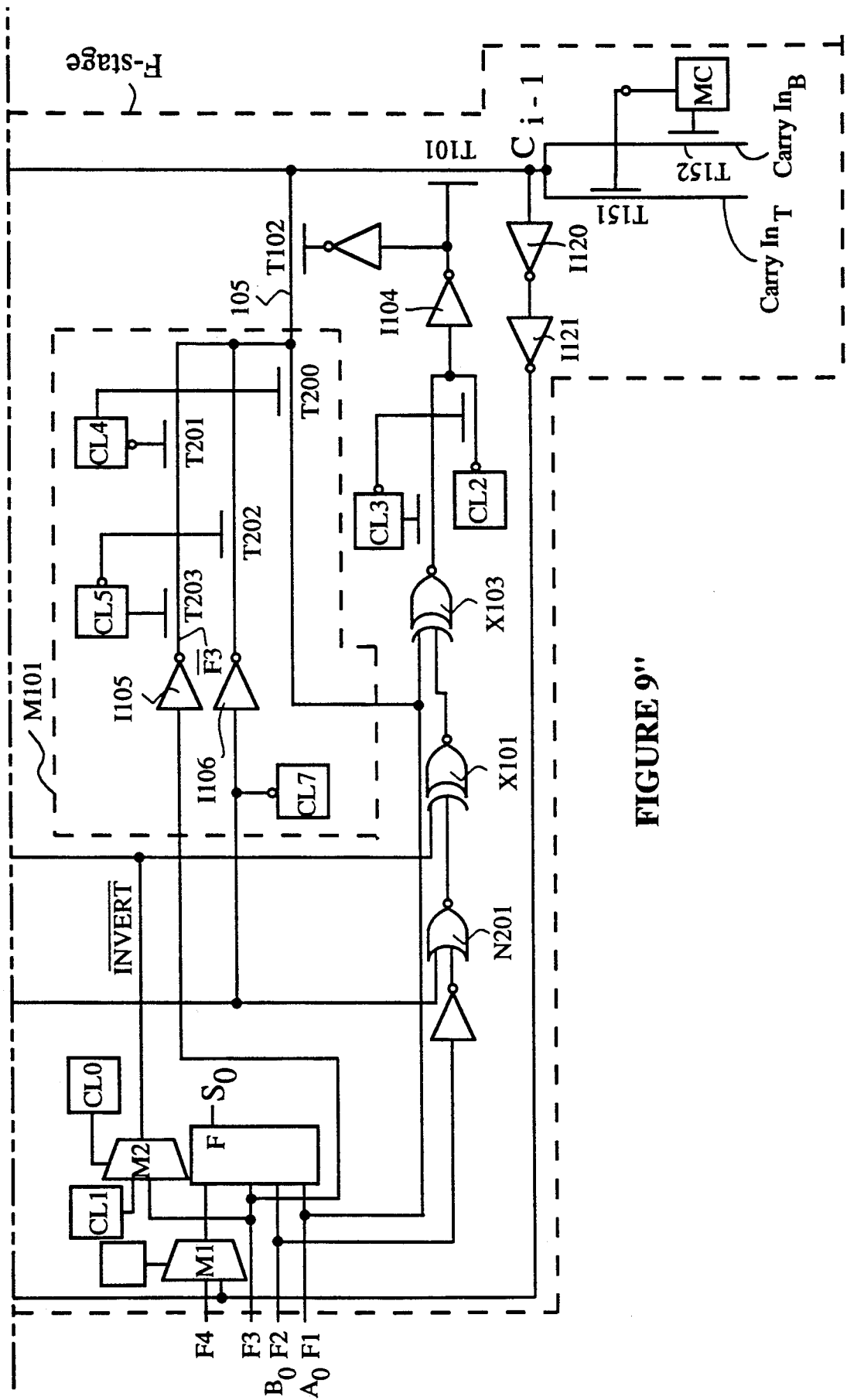

As shown in FIG. 9, two additional gate delays per two bits are added in a preferred embodiment by inverters I101 and I102 in order to maintain signal quality on a long line (approximately four gate delays for four bits). By contrast, the output signal $C_{out}$ of four cascaded conventional ripple carry full-adders, such as shown in FIG. 2, is not available until one XOR gate, four AND gates and four OR gates are passed (nine gate delays). Furthermore, whereas look-ahead carry circuits such as shown in FIG. 3 achieve faster carry propagation only through a much higher density of components, Applicant's invention requires no more components than a conventional ripple carry adder.

FIG. 9 shows a circuit in which the fast carry logic is incorporated in a circuit containing function generators, multiplexers, memory cells and extra logic gates which are used in configuring the circuit for multiple uses.

Input terminals F1 and F2 provide input signals $A_0$ and $B_0$, respectively. Function generator F, XNOR gate X101, memory cells CL0, CL1, multiplexer M2, and a third input terminal F3, work in conjunction to allow the same circuit to function selectively as an adder or as a subtractor. An embodiment in which a storage cell (not shown) receives an output signal $S_0$ from function generator F allows the circuit to function as an accumulator or counter as well. One input of the XNOR gate X101 is the output of M2, and the other input is the output of NOR gate N201. The two inputs to the NOR gate N201 are the complement of the signal on input terminal F2 and the complement of the value in CL7. For the circuit to function as a middle stage in a multi-bit adder, CL7 is set to input a low signal to NOR gate N201. This results in the output of NOR gate N201 being the signal on input terminal F2.

To control whether the circuit functions in the increment mode or the decrement mode, multiplexer M2 determines whether the signal provided by NOR gate N201 will or will not be inverted by XNOR gate X101. The value provided by M2 is provided by F3 or CL1 as controlled by CL0. CL1 is typically used to provide a static value while F3 provides a dynamically changing signal.

When M2 causes the circuit to function in the increment mode, the signal $B_0$ is propagated through XNOR gate X101 to XNOR gate X103. The truth-table of an XNOR gate shows that an input signal on one terminal of an XNOR gate is passed to the output of the XNOR gate when the signal on the other input terminal is high. Therefore, when the output of M2 is high, the carry-logic functions in the increment mode. When the output of M2 is low, however, signal $B_0$ is inverted by XNOR gate X101, and the carry logic of the circuit functions in the decrement mode. Further, if the control signal for selecting the increment/decrement mode originates on the F3 terminal, then this signal will also be applied to function generator F so that the sum logic implemented in function generator F will accordingly also function in either the increment or decrement mode.

First consider that the circuit is being used as an adder or incrementer and that multiplexer M2 is providing a high signal, so that the input $B_0$ is passed to the input of XNOR gate X103.

A second group of memory cells, CL2-CL5 and CL7, work together to allow the circuit of FIG. 9 to perform several functions. For the circuit to operate as a middle stage in a multi-bit adder, memory cells CL3, CL4 and CL5 are set high. Thus the combination X103 and I104 acts as an XOR gate, equivalent to XOR gate 91 in FIG. 8 so that the output of XNOR gate X103 will pass through inverter I104. Setting memory cell CL4 high places the signal from terminal F1 onto line 105. In this configuration the F-stage of FIG. 9 is equivalent to the carry circuit of FIGS. 6 and 8. The signal from F1 is propagated to $C_i$ if transistor T102, equivalent to transistor 93 of FIG. 8, turns on in response to $A_0$ being equal to $B_0$. Setting memory cell CL5 high prevents the value in cell CL7 from simultaneously being propagated to line 105.

Setting CL3 low causes transistors T101 and T102 to be controlled by the signal in memory cell CL2. If CL2 is high, transistor T101 turns on, causing $C_{i-1}$ to be propagated to $C_i$. This configuration of memory cells CL2 and CL3 allows the carry signal $C_{i-1}$ to skip the carry logic of the F-stage. Skipping the carry logic of a particular stage in this way can be useful if layout constraints require a particular stage in a logic block to be used for something other than a stage in the adder (or counter, etc.).

If CL2 is set low (while CL3 is still low), T101 turns off and T102 turns on. When T102 is on, the signal on line 105 will be propagated to $C_i$. The signal on line 105 is controlled by memory cells CL4, CL5, and CL7, which together with inverters I105 and I106 make up 3:1 multiplexer M101. Multiplexer M101 controls which of 3 signals, the signal on terminal F1, the complement of the signal on terminal F3 ($\overline{F3}$), or the signal in memory cell CL7, will be placed on line 105. Note that the signal on F3 may be used by multiplexer M2 or by multiplexer M101.

As noted earlier, when the F-stage operates as a middle stage in a multi-bit adder, memory cells are programmed so that the signal on terminal F1 is placed on line 105. In addition CL3 is set high so that the value provided by XNOR gate X103, which is set to be a function of the $A_0$ and $B_0$ inputs on lines F1 and F2, will determine whether the carry-in signal $C_{i-1}$ or the value on F1 is propagated.

For the F-stage to add the least significant bit in a multi-bit adder, the carry-in can be preset to zero by applying a logic zero to one of Carry-In$_T$ or Carry-In$_B$ and setting memory cell MC to propagate the signal. (Generating this logic zero signal is discussed below in conjunction with FIG. 10.)

Alternatively, to preset the carry-in signal $C_i$ of the G-stage, any of the signal on $\overline{F3}$, the signal in CL7 or the signal on F1 can be used. The signal $\overline{F3}$ is selected to be placed on line 105 by setting CL5 high and CL4 low, and the signal in CL7 is selected by setting both CL4 and CL5 low. The F1 input terminal can also be used to preset the $C_i$ signal when the lowest order bit will be calculated in the G-stage. F1 can be used when the F1 input to the F function generator is not needed. To use F1 as the input for presetting $C_i$, high signals are stored in memory cells CL4 and CL5. Additionally, CL3 is set low and CL2 is set low, turning off transistor T101 and turning on transistor T102 so that the signal on line 105 will propagate to $C_i$.

In addition to functioning as a part of the 3:1 multiplexer M101, memory cell CL7 controls one input to NOR gates N201 and N202. For the F-stage to function as a middle stage in a multi-bit adder for adding values $A_0$ and $B_0$ on terminals F1 and F2, CL7 is set high so that the output of N201 is the signal on the input terminal F2. To add a constant to the input value $A_0$ on F1, CL7 is set low. This forces the input of N201 high, which forces the output of N201 low, and causes the addend to be selected by multiplexer M2. Memory cell CL0 can cause M2 to select between applying the value in CL1 and the value of F3 to XNOR gate X101 for generating an output to be added by X103 to $A_0$ on terminal F1. Thus, by programming CL7 low, a bit can be programmed to a constant value to be added to an input value without having to use the interconnect resources to which terminal F2 would be connected, which may be needed for carrying signals to other logic blocks (not shown).

Not all combinations of logic values in the memory cells of FIG. 9 are acceptable. For example, within M101, contention is possible if memory cell CL4 is high and memory cell CL5 is low, since both high and low signals could be simultaneously placed on line 105. To prevent such contention, software for programming the memory cells may be programmed to prevent this combination. Alternatively, an extra memory cell may be added to select only one of the two signals to be placed on line 105.

Figure 5:
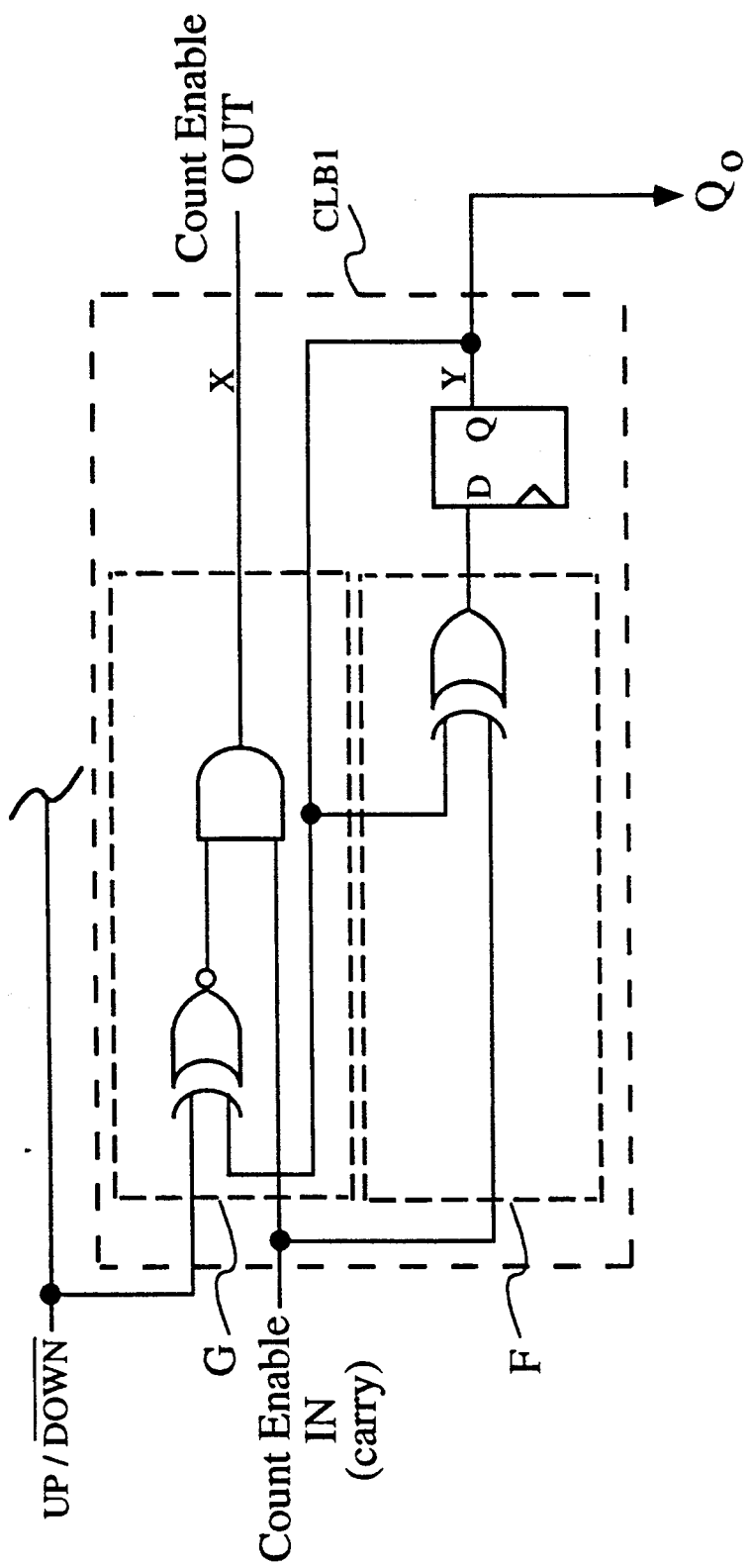
FIG. 5 is a schematic diagram of a prior art counter.

As discussed above, two stages, F-stage and G-stage, each representing one bit of a multi-bit adder, are cascaded together as in FIG. 9. In a preferred embodiment, a logic block will contain two such cascaded stages. Thus a single logic block can implement two bits in a multi-bit function that uses carry logic. This is a distinct improvement in the density of components required to implement functions that use carry logic. By contrast, as shown in FIG. 5, a multi-bit counter is realized in prior-art circuitry with a density of only one bit per logic block.

Regarding the G-stage of FIG. 9, a multiplexer M3 in the G-stage receives the carry-out signal of the F-stage, $C_i$, after it is buffered through two inverters I107 and I108. In an adder, carry-out signal $C_i$ will be combined in the G-function generator with the addends $A_1$ and $B_1$, present on terminals G4 and G1 respectively, to compute the sum bit $S_1$. Carry-out signal $C_i$ of the F-stage is also available to be propagated by transistor T103 to the carry-out $C_{i+1}$ of the G-stage, depending on the configuration conditions of the carry-logic of the G-stage.

Much of the carry-logic of the G-stage is identical to the carry-logic of the F-stage. For example, XNOR gate X102 of the G-stage functions analogously to XNOR gate X101 of the F-stage and is controlled by the output of the same multiplexer M2 to determine whether the G-stage will function as an adder or incrementer on the one hand, or a subtractor or decrementer on the other hand. Additionally, NOR gate N202 of the G-stage functions as NOR gate N201 of the F-stage, where one input is controlled by the memory cell CL7 to allow forcing the addend of the G stage to a constant value without having to use the interconnect resources coupled to the input terminals of the G-stage.

However, instead of memory cells CL2 and CL3 in the F-stage, the G-stage has only one memory cell CL6. CL6 functions similarly to CL3, controlling whether the G-stage functions as a mid-stage in a multi-bit adder or whether the carry signal will bypass the carry logic of the G-stage. When CL6 is high, transistor T105 turns on, and the G-stage functions as a middle stage in a multi-bit adder. When CL6 is low, thereby causing a low signal to be applied through transistor T106 to inverter I110, T103 is on (and T104 off). Turning on transistor T103 allows the carry signal at $C_i$ to bypass the carry logic of the G-stage. As with the F-stage, bypassing the G-stage, or any other particular stage in a logic block, might be required by a design layout which uses the G-stage for a different function.

Multiplexers M3 and M4 in the G-stage are connected and used differently from the multiplexers M1 and M2 of the F-stage. Multiplexer M2 of the F-stage controls whether the carry logic of the G-stage as well as the carry logic of the F-stage will function in an increment-mode or a decrement-mode. However, the G-stage does have its own multiplexer M4 which, in a preferred embodiment, controls whether the sum-logic in the function generator G will perform in the increment-mode or the decrement-mode. M4 is wired to control the sum logic in this way because one of its inputs, G3, is coupled to the same interconnect circuitry (not shown) as is the corresponding input F3 which controls the increment/decrement-mode of the F-function generator.

The other inputs of the multiplexers M3 and M4 of the G-stage are distributed so that signals needed simultaneously are not input into the same multiplexer. To operate as a middle stage in a multi-bit adder, the G-function generator needs both a signal controlling whether it operates in the increment or decrement mode, and a carry-out signal from the less significant bit. Thus, the increment/decrement mode signal applied to F3 is also applied through G3 to multiplexer M4 and the carry out signal from the less significant bit is routed to the multiplexer M3, making both signals available simultaneously to the G-function generator.

Further, in order to detect an overflow, as will be discussed below, the signals $C_i$ and $C_{i-1}$ must be compared and so must be available simultaneously. Thus the signal $C_i$ is input to multiplexer M3 and the signal $C_{i-1}$ is input to the other multiplexer M4, so that both can be available together to be input to the G-function generator.

The circuit of FIG. 9, comprising two stages cascaded together has the further ability to detect in the G-stage an overflow in processing the most significant bit, performed in a previous block. It is well known in the art to detect an overflow by recognizing that the carry of the sign bit is different from the carry of the most significant bit. Detecting an overflow condition can thus be accomplished by computing the XOR function of the carry of the sign bit and the carry of the most significant bit. In the circuit shown in FIG. 9, the carry of the most significant bit is presented at $C_{i-1}$, the carry-in to the F-stage, and the carry of the sign bit (which is a function of the $A_0$ and $B_0$ signals to the F-stage and the $C_{i-1}$ signal, is presented to $C_i$, the carry-out of the F-stage. $C_{i-1}$ is routed through I120 and I121 to the multiplexer M4 in the G-stage. $C_i$ is routed through I107 and I108 to the multiplexer M3 in the G-stage. To configure the circuit of FIG. 9 to detect an overflow, M3 is programmed to route $C_i$ to the G-function generator, and M4 is programmed to route $C_{i-1}$ to the G-function generator. The G function generator is programmed to compute the XOR function of $C_i$ and $C_{i-1}$ which, as discussed above, is an overflow detect signal.

The circuit of FIG. 9 can also function in the decrement mode. In the decrement mode, the circuit can decrement a counter or perform subtraction, including subtracting a constant from a variable.

Several modes for performing subtraction can be used with the circuit of FIG. 9. Three common modes for subtraction are two's complement, one's complement and sign-magnitude.

When the two's complement mode of subtraction is to be used, the carry-in bit of the least significant bit is preset to logic one. If the least significant bit is to be provided by the F-stage, the carry in of the least significant bit is preset through Carry In$_T$ or Carry In$_B$ and memory cell MC is set to propagate the signal to $C_{i-1}$. To apply a preset signal to Carry In$_B$ or Carry In$_T$ of the F-stage, the preset signal is generated in the F-stage of another logic block, and connected to the F-stage of the least significant bit, by a means to be discussed below, in connection with FIGS. 10-12. The signal may be generated in the F-stage as discussed above and passed through the G-stage to the next logic block by turning on transistor T103 and turning off transistor T104. Thus the carry logic in the G-stage of that logic block used to generate a preset signal is bypassed.

Alternatively, if the least significant bit is to be provided by the G-stage in a two's complement subtraction, then transistor T101 is turned off and transistor T102 is turned on (by setting CL3 low and CL2 low) so that one of the three inputs of multiplexer M101 can be used to preset $C_i$ to logic one. Multiplexer M101 can provide the logic one through the F3 terminal by applying a low signal to F3, and setting CL5 high and CL4 low. Multiplexer M101 can provide the logic one as a stored value in memory cell CL7 by setting CL7 high, CL5 low, and CL4 low. Multiplexer M101 can provide the logic one through the F1 input terminal by applying a high signal on F1, and setting CL5 and CL4 high.

When performing one's complement subtraction or sign-magnitude subtraction, the carry-in of the least significant bit is usually preset to logic zero. In the case of one's complement subtraction the carry-out of the sign bit must be added to the least significant bit to generate the final answer. This may be accomplished by connecting the carry out terminal of the sign bit to the carry in terminal of the least significant bit rather than presetting the carry in of the least significant bit. Alternatively, the carry out of the sign bit is added to the generated sum. When the least significant bit is to be calculated in the F-stage, carry-in $C_{i-1}$ is preset to zero by applying a logic zero to Carry In$_T$ or Carry In$_B$ and setting memory cell MC to propagate the signal to $C_{i-1}$. When the least significant bit is to be calculated in the G-stage, carry-in $C_i$ is preset to zero through one of the three paths in multiplexer M101 as discussed above. For providing the logic zero through the F3 terminal, a high signal is applied to F3 (since it will be inverted). For providing the logic signal through CL7, the logic zero is loaded into CL7. For providing the logic zero through F1, a low signal is applied to F1.

For both two's complement and one's complement subtraction, the output of multiplexer M2 must be set low. For sign-magnitude subtraction, the output of M2 depends upon whether the signs of the two numbers to be subtracted are the same. For sign-magnitude subtraction, the output of M2 is set low if the two numbers are of the same sign. The output of M2 is set high if the two numbers are of opposite signs.

Figure 10:
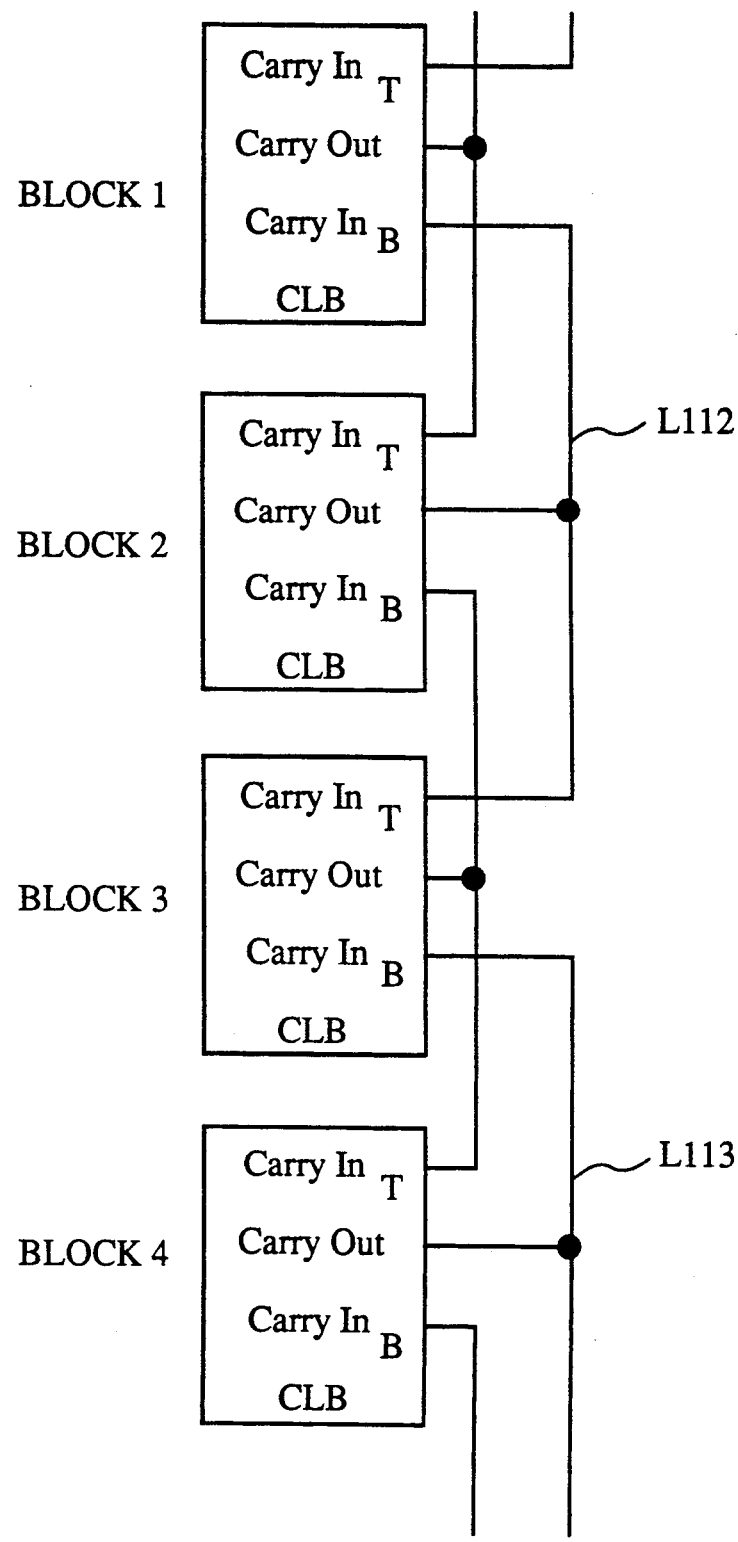
FIG. 10 is a schematic diagram of a logic array showing one embodiment of dedicated-carry-logic interconnect circuitry.

A further embodiment, a multi-bit adder, is described with reference to FIG. 10. Here an ordered array of blocks 1-4, each block comprising a circuit as shown in FIG. 9, is provided such that the carry-out, labeled $C_{i+1}$ in FIG. 9 and labeled Carry Out on each logic block in FIG. 10 is connected both to the carry-in of the logic block above, labeled Carry In$_B$ in both figures and the carry-in of the logic block below, labeled Carry In$_T$ in both figures. Further, each logic block can selectively receive a carry signal either from the logic block above (on terminal Carry-In$_T$) or the logic block below (on terminal Carry In$_B$). Whether a logic block receives a carry signal from the logic block above or the logic block below is controlled by memory cell MC. If MC is high, transistor T152 is on, and the carry signal from the logic block below is received on the Carry In$_B$ terminal. If MC is low, transistor T151 is on, and the carry signal from the logic block above is received on the Carry In$_T$ terminal. For example, line L112 connects the carry-out terminal of block 2 to the carry-in terminal Carry In$_B$ of block 1 and to the carry-in terminal Carry In$_T$ of block 3. Similarly, line L113 connects the carry-out terminal of block 4 to the carry-in terminal Carry In$_B$ of block 3 and the carry-in terminal Carry In$_T$ of block 5 (not shown). Thus, block 3 receives a carry signal on Carry In$_B$ from block 4 on L113 and on Carry In$_T$ from block 2 on L112. How memory cell MC is programmed will determine which of transistors T151 and T152 will be on, and thus which of the carry signals will be used by the internal circuitry of logic block 3.

The primary benefit of dedicated carry interconnect circuitry is that it performs much faster than does programmable carry interconnect circuitry. This increased performance is traded for the flexibility of the programmable interconnects. However, the dedicated interconnect circuitry shown in FIG. 10 is flexible in that the carry signals can be propagated in either of two directions through the array.

Figure 11:
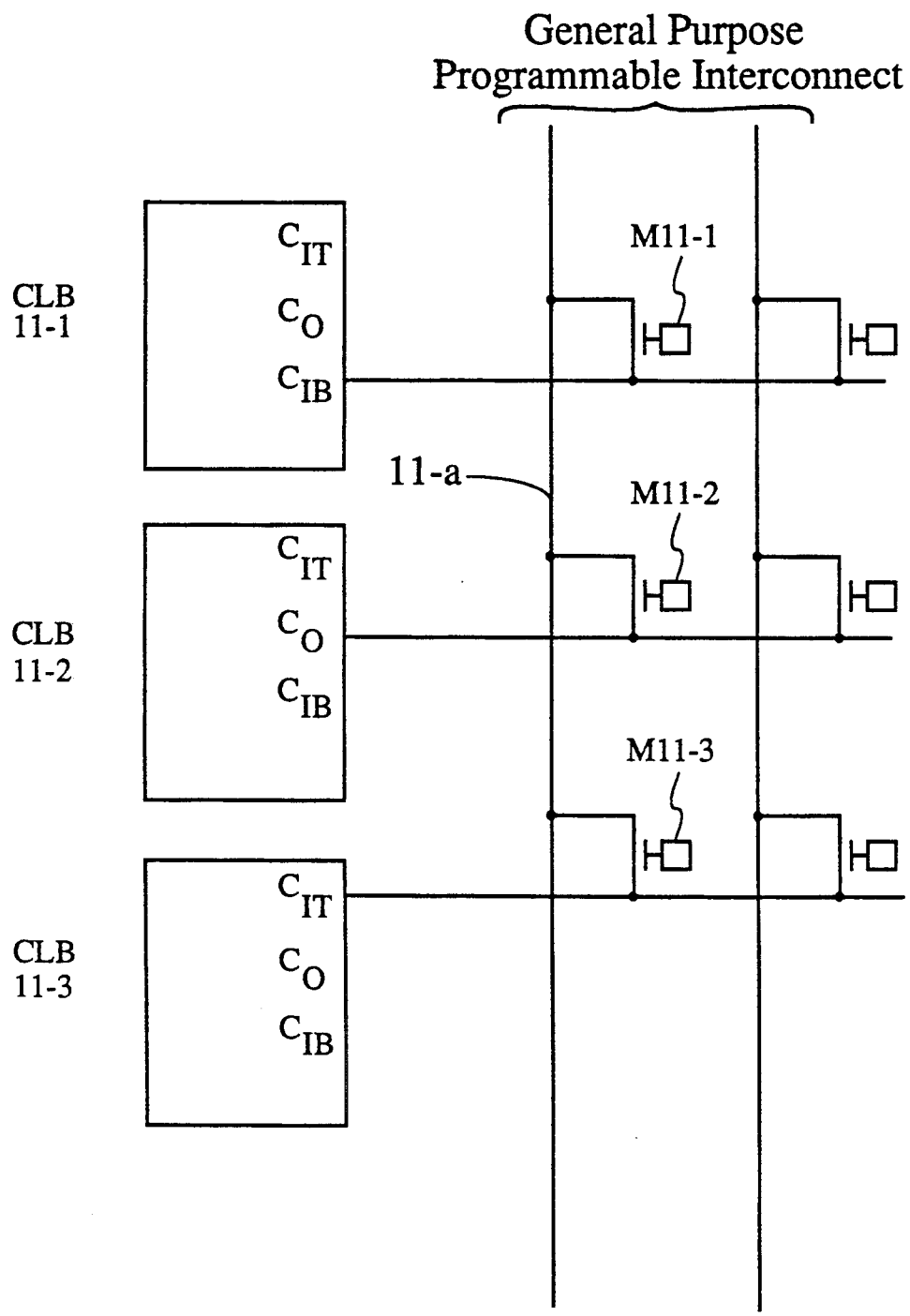
FIG. 11 is a schematic diagram showing an example of carry interconnect circuitry implemented with programmable interconnects.

FIG. 11 shows an interconnect structure which does not use dedicated interconnect circuitry for propagating signals in a choice of directions through an array. FIG. 11 shows only a partial set of memory cells and interconnects which would be needed in the interconnect structure for interconnecting logic blocks to form a multi-bit adder or other multi-bit function that uses carry logic. According to FIG. 11, output $C_0$ of logic block 11-2 can be connected to either logic block 11-1 or logic block 11-3 by turning on a corresponding transistor controlled by memory cell M11-2 which connects the output of logic block 11-2 to interconnect line 11-a. If it is desired to connect output $C_0$ of logic block 11-2 to input $C_{IB}$ of logic block 11-1, memory cell M11-1 is programmed to turn on its corresponding transistor so that the signal on line 11-a will propagate to terminal $C_{IB}$ of block 11-1. If it is desired to connect output $C_0$ to logic block 11-3, memory cell M11-3 is turned on to connect interconnect line 11-a to input $C_{IT}$ of logic block 11-3. Other memory cells (not shown) can likewise be programmed to control the direction of signal propagation from one logic block to the next. It is easy to see that a large number of memory cells is needed in order to provide flexibility in controlling the propagation direction of the carry signal through the stages of a multi-bit adder.

Figure 12:
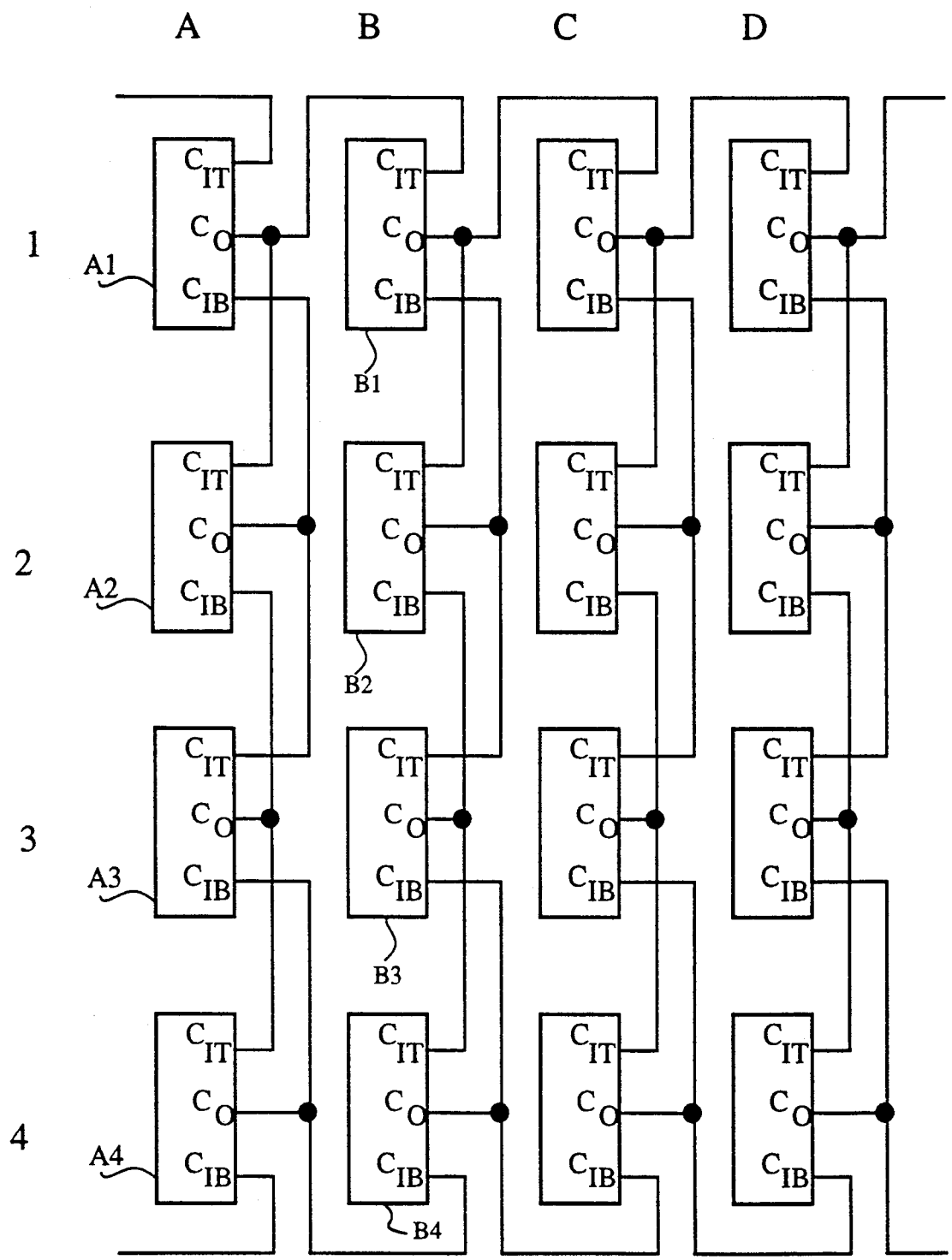
FIG. 12 is a schematic diagram showing one embodiment of dedicated carry logic interconnect circuitry.

Another embodiment shown in FIG. 12 exhibits more sophisticated dedicated carry interconnect circuitry. This dedicated interconnect circuitry allows a carry chain to be built in a serpentine fashion of arbitrary length. Some of the blocks are configured as in FIG. 10, that is, such that the carry-out signal is propagated to both the logic block above and the logic block below.

However, at the top and bottom edges of the array, the circuits are configured differently. At the top edge, the carry-out signal of a logic block is propagated to the carry-in of the logic block below, and to the carry-in of the logic block to the right. Further, each top logic block receives a carry-in signal from the logic block below and from the logic block to the left. Each circuit on the bottom is configured such that the carry-out signal of a logic block is propagated to the carry-in of the logic block above, and to the carry-in of the logic block to the right. Further, each bottom circuit receives a carry-in signal from the logic block above and from the logic block to the left. Memory cell MC of each logic block controls which carry-in signal of the two available carry-in signals will be received by the logic block as discussed in connection with FIG. 10.

The sophisticated dedicated interconnect circuitry shown in FIG. 12 is especially useful in providing increased flexibility in design layouts. Multi-bit adders or counters, or other multi-bit arithmetic functions, need not be restricted to a particular column of logic blocks. For example, an eight-bit counter can be implemented in the horseshoe configuration consisting of logic blocks B3, B4, A4, and A3, where A3 will contain the least significant bit and the next more significant bit, A4 the next two more significant bits, B4 the next, and finally, B3 the two most significant bits. The memory cells MC of each block will be programmed such that the carry signal will propagate from $C_0$ of logic block A3 to $C_{IT}$ of logic block A4, then from $C_0$ of logic block A4 to $C_{IB}$ of logic block B4, and finally from $C_0$ of logic block B4 to $C_{IB}$ of logic block B3. Since the internal circuitry of the logic blocks (as shown in FIG. 9) allows the carry logic of any particular bit(s) to be bypassed, the eight-bit counter (or other function using carry logic) need not be realized in adjacent blocks. So, for example, the least significant bits could be in logic block A2 instead of A3, with the other six bits being in A4, B4, B3 as in the previous example. By appropriately programming the memory cells CL2, and CL3 and CL6 in block A3, the carry signal $C_0$ of logic block A2 will bypass the carry logic of logic block A3, and propagate to $C_{IT}$ of logic block A4.

Many other embodiments of the present invention incorporating the features taught here will become obvious to those skilled in the art in light of the above disclosure. For example, regarding the dedicated interconnect of the carry logic between logic blocks, although FIG. 12 shows interconnecting logic blocks in a serpentine structure and FIGS. 10 and 12 show two adjacent logic blocks providing input to the carry logic of a particular logic block, it is possible for more than two logic blocks to provide input to the carry logic of a particular logic block and it is possible to interconnect logic blocks which are not contiguous. Further, although FIG. 9 shows a logic block having two stages of carry logic and two function generators, it is possible to form logic blocks having one stage or having more than two stages. An embodiment in which one logic block has four stages, and in which inverters for buffering the carry signal are provided only once for the four stages, offers a speed improvement over the embodiment of FIG. 9, and may be preferred for certain design specifications.

For another example, although the control circuitry of FIG. 9 is described as controlled by memory cells, it is obvious that these memory cells can be SRAM memory cells, EPROMS, EEPROMS, fuses, or antifuses. It is also obvious that control signals can be provided by output signals of logic gates and other available signals. These embodiments and others which become obvious in light of the above disclosure are intended to fall within the scope of the present invention.

We claim:

1. A programmable logic device comprising an array of logic blocks, each logic block having at least one circuit comprising:
   a first input terminal and a second input terminal;
   a carry-in terminal and a carry-out terminal;
   first switching means for connecting said first input terminal to said carry-out terminal;
   second switching means for connecting said carry-in terminal to said carry-out terminal;
   control means for causing said first switching means to connect said first input terminal to said carry-out terminal and for causing said second switching means to connect said carry-in terminal to said carry-out terminal;
   said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
   said logic block further having means for generating at an output terminal one of a plurality of logic functions of a given set of inputs, at least one of said first and second input terminal further providing input to said means for generating one of a plurality of logic functions;
   and further comprising:
   means for disconnecting said first input terminal from said carry-out terminal, said means for disconnecting being controllable to disconnect said first input terminal from said carry-out terminal independent of the states of said signals on said first and second input terminals; and
   means for applying an alternative signal to said carry-out terminal when said means for disconnecting is disconnecting.

2. A programmable logic device as in claim 1 further comprising:
   a third input terminal;
   means for selecting said alternative signal from a stored value and a signal on said third input terminal.

3. A programmable logic device comprising an array of logic blocks, each logic block having at least one circuit comprising:
   a first input terminal and a second input terminal;
   a carry-in terminal and a carry-out terminal;
   first switching means for connecting said first input terminal to said carry-out terminal;
   second switching means for connecting said carry-in terminal to said carry-out terminal;
   control means for causing said first switching means to connect said first input terminal to said carry-out terminal and for causing said second switching means to connect said carry-in terminal to said carry-out terminal;
   said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
   said logic block further having means for generating at an output terminal one of a plurality of logic functions of a given set of inputs, at least one of said first and second input terminal further providing input to said means for generating one of a plurality of logic functions;
   and further comprising:
   a third input terminal;
   means for providing a signal on said third input terminal;
   means for selecting between causing said first switching means to connect said first input terminal to said carry-out terminal and causing said first switching means to apply said signal on said third terminal to said carry-out terminal.

4. A programmable logic device as in claim 3 further comprising means for selecting between applying a stored value to said carry-out terminal and applying an input signal to said carry-out terminal.

5. A programmable logic device comprising an array of logic blocks, each logic block having at least one circuit comprising:
   a first input terminal and a second input terminal;
   a carry-in terminal and a carry-out terminal;
   first switching means for connecting said first input terminal to said carry-out terminal;
   second switching means for connecting said carry-in terminal to said carry-out terminal;
   control means for causing said first switching means to connect said first input terminal to said carry-out terminal and for causing said second switching means to connect said carry-in terminal to said carry-out terminal;
   said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
   said logic block further having means for generating at an output terminal one of a plurality of logic functions of a given set of inputs, at least one of said first and second input terminal further providing input to said means for generating one of a plurality of logic functions;
   and further comprising:
   means for inverting or not inverting a signal to generate an operand; and
   means for applying said operand to said second input terminal.

6. A programmable logic device comprising an array of logic blocks, each logic block having at least one circuit comprising:
- a first input terminal and a second input terminal;
- a carry-in terminal and a carry-out terminal;
- first switching means for connecting said first input terminal to said carry-out terminal;
- second switching means for connecting said carry-in terminal to said carry-out terminal;
- control means for causing said first switching means to connect said first input terminal to said carry-out terminal and for causing said second switching means to connect said carry-in terminal to said carry-out terminal;
- said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
- said logic block further having means for generating at an output terminal one of a plurality of logic functions of a given set of inputs, at least one of said first and second input terminal further providing input to said means for generating one of a plurality of logic functions;

and further comprising:
- an XNOR gate;
- a first inverter and a second inverter;
- third and fourth switching means; and
- a first memory cell and a second memory cell, each having an output and an output-complement;
- wherein said first input terminal and said second input terminal are inputs to said XNOR gate,
- an output of said XNOR gate is input to said first inverter by said third switching means;
- the output of said first inverter is input to said second inverter;
- said output-complement of said first memory cell is input to said first inverter by said fourth controllable switching means,
- said first switching means is controlled by the output signal of said second inverter,
- said second switching means is controlled by said output signal of said first inverter,
- said third switching means is controlled by said output of said second memory cell,
- said fourth controllable switching means is controlled by said output-complement of said second memory cell.

7. A programmable logic device as in claim 6 in which said memory cells are static random access memory cells.

8. A programmable logic device as in claim 6 in which said memory cells are electrically programmable switches.

9. A programmable logic device as in claim 8 in which said electrically programmable switches are electrically erasable.

10. A programmable logic device as in claim 6 in which said memory cells are fuses.

11. A programmable logic device as in claim 6 in which said memory cells are antifuses.

12. A programmable logic device comprising an array of logic blocks, each logic block having at least one circuit comprising:
- a first input terminal and a second input terminal;
- a carry-in terminal and a carry-out terminal;
- first switching means for connecting said first input terminal to said carry-out terminal;
- second switching means for connecting said carry-in terminal to said carry-out terminal;
- control means for causing said first switching means to connect said first input terminal to said carry-out terminal and for causing said second switching means to connect said carry-in terminal to said carry-out terminal;
- said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
- said logic block further having means for generating at an output terminal one of a plurality of logic functions of a given set of inputs, at least one of said first and second input terminal further providing input to said means for generating one of a plurality of logic functions;

and further comprising a three-way multiplexer for selecting between causing said first switching means to connect said first input terminal to said carry-out terminal, causing said first switching means to connect a third input terminal to said carry-out terminal, and causing said first switching means to apply a stored value to said carry-out terminal.

13. A programmable logic device comprising an array of logic blocks, each logic block having at least one circuit comprising:
- a first input terminal and a second input terminal;
- a carry-in terminal and a carry-out terminal;
- first switching means for connecting said first input terminal to said carry-out terminal;
- second switching means for connecting said carry-in terminal to said carry-out terminal;
- control means for causing said first switching means to connect said first input terminal to said carry-out terminal and for causing said second switching means to connect said carry-in terminal to said carry-out terminal;
- said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
- said logic block further having means for generating at an output terminal one of a plurality of logic functions of a given set of inputs, at least one of said first and second input terminal further providing input to said means for generating one of a plurality of logic functions;
and further comprising:
a third input terminal;
means for providing a stored value;
third, fourth, fifth, and sixth controllable switching means; and
means for controlling said third, fourth, fifth and sixth controllable switching means such that:
said third input terminal is coupled to said carry-out terminal only when said first, third, and fifth switching means are conductive;
said stored value is coupled to said carry-out terminal only when said sixth and said first switching means are conductive; and
said first input terminal is coupled to said carry-out terminal only when said fourth and first switching means are conductive.

14. A programmable logic device comprising an array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;
said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
said logic block further having means for generating at an output terminal one of a plurality of logic functions of a given set of inputs, at least one of said first and second input terminal further providing input to said means for generating one of a plurality of logic functions;
in which said means for causing comprises:
an XNOR gate having two input terminals coupled respectively to said first and second input terminals, and an output terminal;
a first inverter, the output of said first inverter controlling said second switching means;
means for providing a stored value;
third switching means, wherein said third switching means selects between providing said stored value and a signal output from said XNOR gate to the input terminal of said first inverter; and
a second inverter connected to the output terminal of said first inverter, the output terminal of said second inverter controlling said first switching means.

15. A programmable logic device comprising an array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;
said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
said logic block further having means for generating at an output terminal one of a plurality of logic functions of a given set of inputs, at least one of said first and second input terminal further providing input to said means for generating one of a plurality of logic functions;
and further comprising:
an XNOR gate;
a first memory cell and second memory cell;
a first multiplexer with at least two inputs and one output;
a third input terminal;
wherein the output of said first memory cell is an input of said first multiplexer;
said third input terminal is an input of said first multiplexer;
the output of said second memory cell selects between connecting said first memory cell and connecting said third input terminal to said output terminal of said first multiplexer;
the output of said first multiplexer is an input of said XNOR gate;
said second input terminal is coupled to an input of said XNOR gate;
said second input terminal is coupled to an input of said XNOR gate; and
said XNOR gate and said first input terminal control said means for causing.

16. An ordered array of logic blocks each comprising at least one array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;
said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;

said logic block further having means for generating at an output terminal one of a plurality of logic functions of a given set of inputs, at least one of said first and second input terminal further providing input to said means for generating one of a plurality of logic functions;

wherein said carry-out terminal of a second logic block is coupled to at least said carry-in terminal of a first logic block preceding said second logic block and to said carry-in terminal of a third logic block following said second logic block, and in which said logic blocks are positioned in a rectangular array of horizontal rows and vertical columns and in which said first logic block and said third logic block are positioned in one of the same column as said second logic block and the same row as said second logic block.

17. An ordered array of logic blocks as in claim 16 in which said first logic block and said third logic block are contiguous to said second logic block.

18. An integrated circuit structure comprising:
an array of configurable logic blocks, said configurable logic blocks each including
  means for calculating a selectable one of a plurality of functions of a plurality of input signals, including at least a sum function and another function having a truth table different from the sum function; and
  dedicated hardware for performing the carry function, said dedicated hardware including
    means for receiving at least some of said plurality of input signals;
    means for receiving a carry-in signal;
    means for providing a carry-out signal; and
    means for calculating said carry function from said carry-in signal and some of said plurality of input signals, and generating said carry-out signal.

19. An integrated circuit structure as in claim 18 further comprising:
dedicated interconnect lines for interconnecting said hardware for performing the carry function in a first logic block to hardware for performing the carry function in at least a second logic block.

20. An integrated circuit structure as in claim 19 in which said dedicated interconnect lines further comprise lines for interconnecting said hardware for performing the carry function in a first logic block to hardware for performing the carry function in at least a third logic block.

21. An integrated circuit structure comprising:
programmable interconnect lines;
an array of configurable logic blocks, said configurable logic blocks each including
  means for calculating a selectable function of a plurality of input signals, including at least a sum function and another function; and
  dedicated hardware for performing the carry function, comprising:
    means for receiving at least some of said plurality of input signals;
    a carry-out terminal;
    means for generating a carry-out signal in response to a carry-in signal on said carry-in terminal and input signals on selected ones of said programmable interconnect lines, and placing said carry-out signal on said carry-out terminal; and
    means for selecting said carry-in signal of said third logic block from among at least carry-out signals on said carry-out terminals of said first and second logic blocks.

22. An integrated circuit structure as in claim 21 in which said logic blocks are located in rows and columns within said integrated circuit structure, and said third logic block is positioned contiguous to said first and second logic blocks.

23. An integrated circuit structure as in claim 22 in which said first logic block is positioned to the left of said third logic block and said second logic block is positioned below said third logic block.

24. An integrated circuit structure as in claim 22 in which said first logic block is positioned to the left of said third logic block and said second logic block is positioned above said third logic block.

25. An integrated circuit structure as in claim 22 in which said first logic block is positioned above said third logic block and said second logic block is positioned below said third logic block.

26. An integrated circuit structure as in claim 21 in which said logic blocks are positioned in rows and columns and said first and second logic blocks are located in the same row or same column as said third logic block.

27. An array of configurable logic blocks, each logic block comprising:
two stages, each stage comprising:
  at least a first input terminal and a second input terminal;
  a carry-in terminal;
  a carry-out terminal;
  dedicated circuitry for performing carry logic with at least three inputs and at least one output;
  wherein three of said at least three inputs comprise:
    a signal on said first input terminal;
    a signal on said second input terminal; and
    a signal on said carry-in terminal; and
  wherein said output is a carry function of said three inputs;
said carry-out terminal of said first stage being connected directly to said carry-in terminal of said second stage, and said carry-out terminal of said second stage being connected through buffering means to said carry-in terminal of another one of said logic blocks; and controllable means for substituting for said carry-out signal a stored signal to said carry-out terminal.

28. An array as in claim 27 further comprising:
controllable means for selectively propagating said signal on said carry-in terminal to said carry-out terminal; or propagating said signal on one of said first input terminal and said second input terminal to said carry-out terminal.

29. An array as in claim 27 further comprising:
a third input terminal;
controllable means for selectively propagating a signal on said third input terminal to said carry-out terminal.

30. An array as in claim 27 further comprising:

controllable means for selectively propagating said signal on said carry-in terminal to said carry-out terminal independent of signals on said first and second input terminals.

31. An array as in claim 27 further comprising:
second means for computing the carry function of said signal on said first input terminal, said signal on said carry-in terminal, and a complement of said signal on said second input terminal; and
means for selecting between using said at least one circuit or said at least one stage and using said second means.

32. A programmable logic device comprising an array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;
said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
said logic block further having means for generating at an output terminal one of a plurality of logic functions of a given set of inputs, at least one of said first and second input terminal further providing input to said means for generating one of a plurality of logic functions;
and further comprising:
means for receiving a first input signal and placing said first input signal on said first input terminal;
means for receiving a second input signal;
means for selecting between placing said second input signal, the complement of said second input signal, and a constant value on said second input terminal.

33. A programmable logic device as in claim 32 in which said means for selecting comprises:
means for replacing said second input signal with a first constant value;
means for controlling said means for replacing; and
means for selectively inverting said first constant value.

34. A programmable logic device comprising an array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;
said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;
said logic block further having means for generating at an output terminal one of a plurality of logic functions of a given set of inputs, at least one of said first and second input terminal further providing input to said means for generating one of a plurality of logic functions; and
each logic block having at least:
a first circuit and a second circuit, said carry-out terminal of said first circuit being connected to said carry-in terminal of said second circuit, said carry-out terminal of said second circuit being coupled to a carry-out terminal of said logic block;
at least one carry-in terminal of said logic block; and
means for using a signal on one of said at least one carry-in terminal of said logic block as a carry-in signal on said carry-in terminal of said first circuit;
in which said second circuit further comprises:
means for comparing a signal on said carry-out terminal of said first circuit to said carry-in signal on said first circuit, thereby being useful for detecting an overflow condition.

35. A programmable logic device as in claim 34 in which said means for comparing comprises:
a first multiplexer for selecting between said carry-in signal of said first circuit and a first input signal to said second circuit;
a second multiplexer for selecting between said carry-out signal of said first circuit and a second input signal to said second circuit;
means for controlling said first and second multiplexers;
means for generating the XOR function of signals provided by said first and second multiplexers.

36. A programmable logic device as in claim 35 in which said means for generating the XOR function of signals provided by said multiplexers comprises a combinatorial function generator.

37. A programmable logic device comprising an array of logic blocks, each logic block having at least one circuit comprising:
a first input terminal and a second input terminal;
a carry-in terminal and a carry-out terminal;
first switching means for connecting said first input terminal to said carry-out terminal;
second switching means for connecting said carry-in terminal to said carry-out terminal;
control means for causing said first switching means to connect said first input terminal to said carry-out terminal and for causing said second switching means to connect said carry-in terminal to said carry-out terminal;

said control means causing said first switching means to connect said first input terminal to said carry-out terminal when and only when the logic value of a signal on said first input terminal is equal to the logic value of a signal on said second input terminal, and said control means causing said second switching means to connect said carry-in terminal to said carry-out terminal when and only when said logic value of said signal on said first input terminal does not equal said logic value of said signal on said second input terminal;

said logic block further having means for generating at an output terminal one of a plurality of logic functions of a given set of inputs, at least one of said first and second input terminal further providing input to said means for generating one of a plurality of logic functions; and controllable means for selectively propagating said signal on said carry-in terminal to said carry-out terminal; or propagating said signal on one of said first input terminal and said second input terminal to said carry-out terminal.

* * * * *

UNITED STATES PATENT AND TRADEMARK OFFICE
CERTIFICATE OF CORRECTION

PATENT NO. : 5,267,187
DATED : November 30, 1993
INVENTOR(S) : Hung-Cheng Hsieh, et al.

It is certified that error appears in the above-indentified patent and that said Letters Patent is hereby corrected as shown below:

On title page, insert item [73] Assignee; --Xilinx, Inc., San Jose, Calif.--

Insert on title page, --Primary Examiner, Tan V. Mai--
Insert --Attorney, Agent or Firm: Edel M. Young, Bradley A. Greenwald, Alan H. MacPherson--

Col. 19, between lines 67 and 68, insert the following line;
--a carry-in terminal;--

Signed and Sealed this

Eighteenth Day of October, 1994

Attest:

BRUCE LEHMAN

Attesting Officer            Commissioner of Patents and Trademarks